Feb. 12, 1957 A. B. GERHAN 2,780,990
PARIMUTUEL TICKET PRINTING MACHINE
Filed June 25, 1949 10 Sheets-Sheet 1
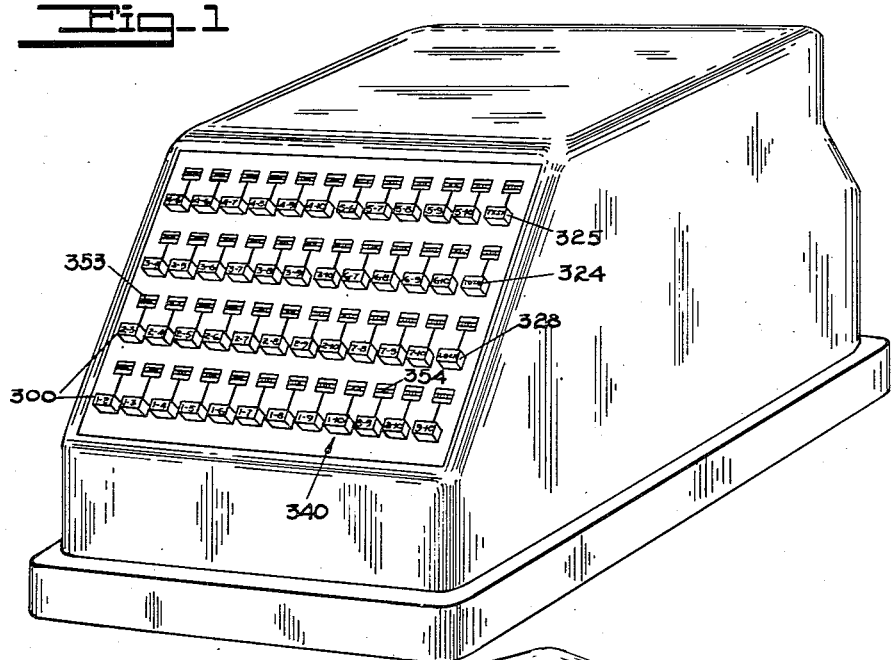
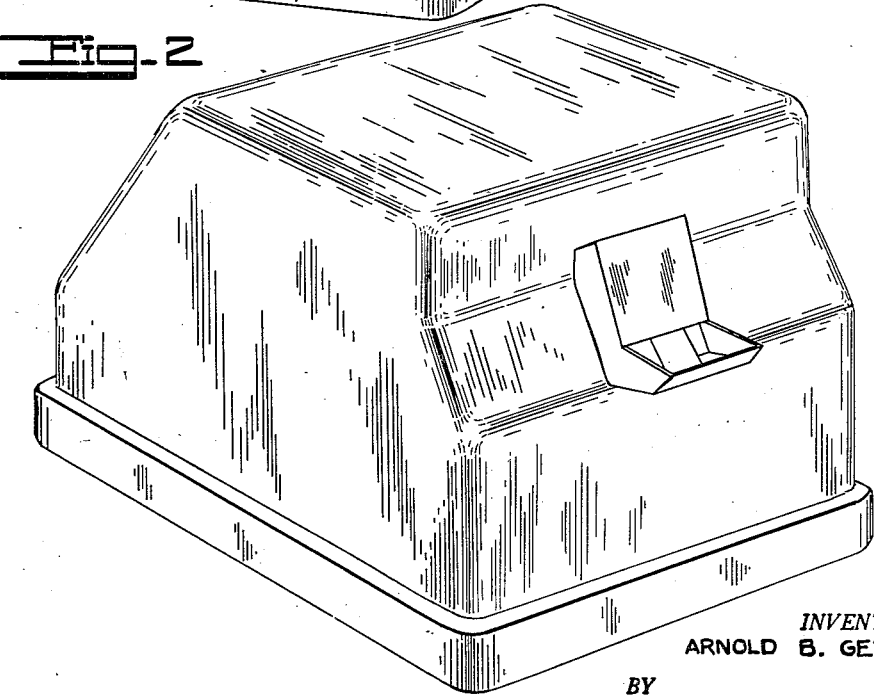
INVENTOR.
ARNOLD B. GERHAN
BY
Boyken, Mohler & Beckley
ATTORNEYS Feb. 12, 1957 A. B. GERHAN 2,780,990
PARIMUTUEL TICKET PRINTING MACHINE
Filed June 25, 1949 10 Sheets-Sheet 2
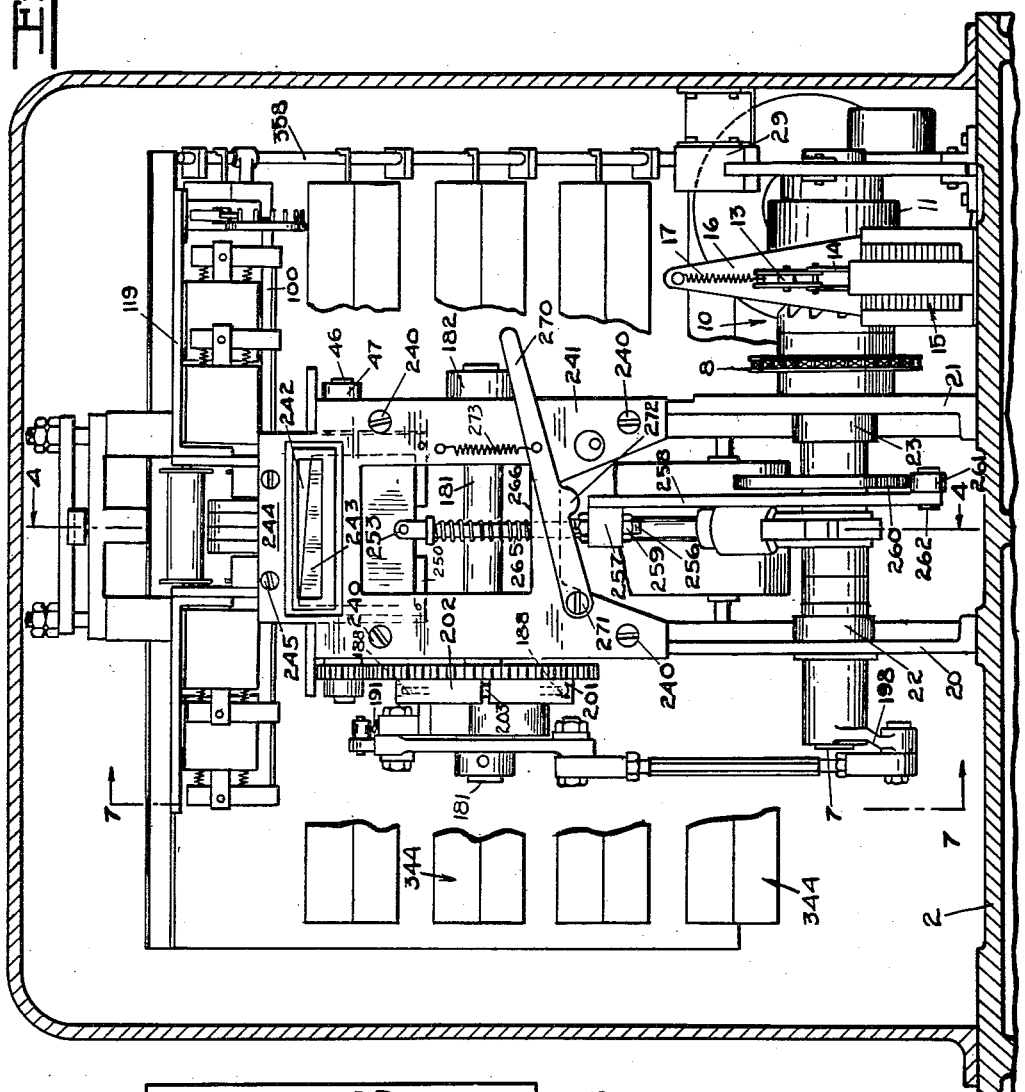
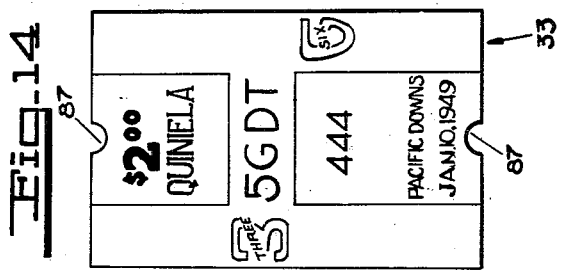
*INVENTOR.*
ARNOLD B. GERHAN
BY
Boyken, Mohler + Beekley
ATTORNEYS

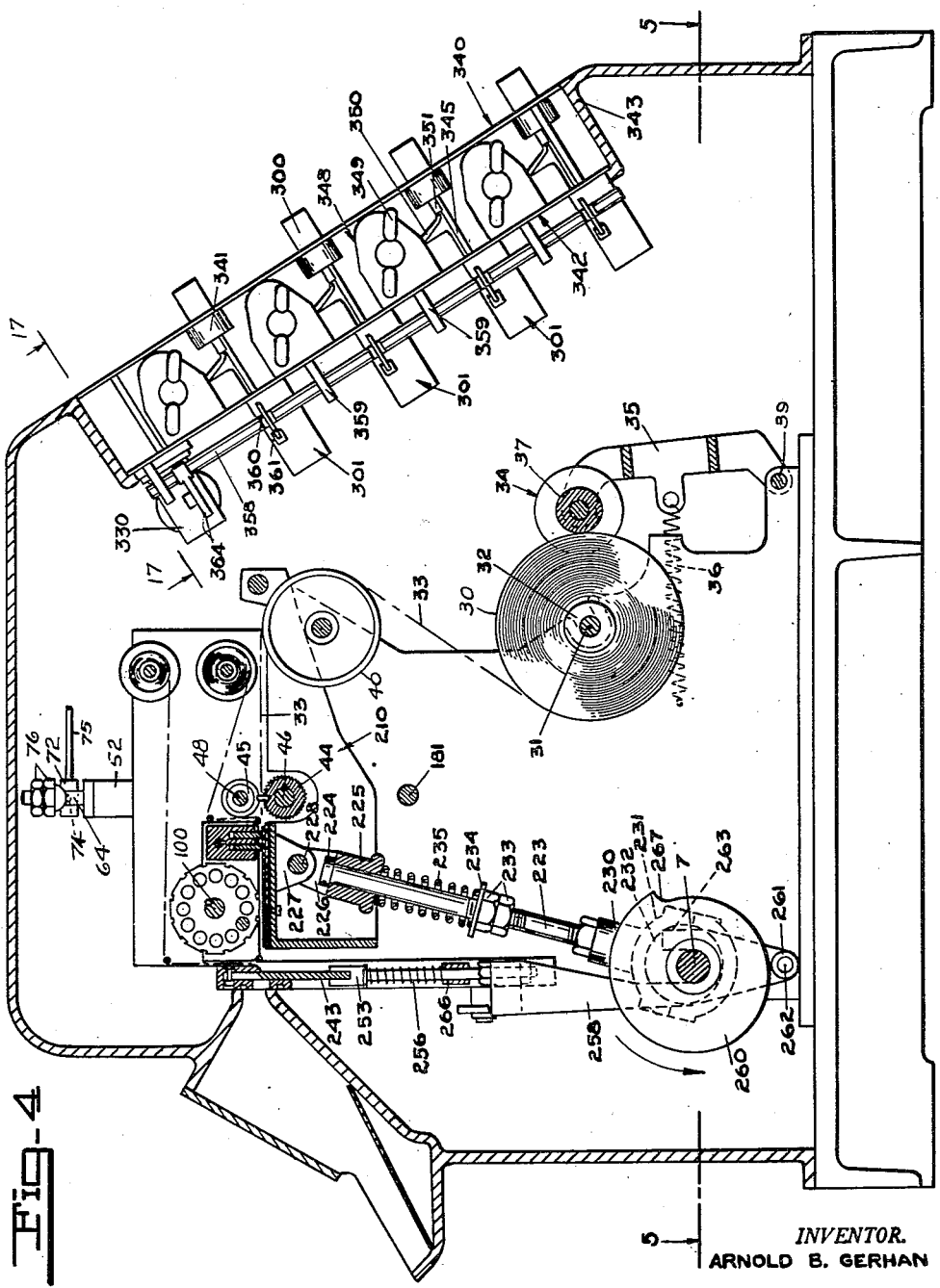

Feb. 12, 1957  A. B. GERHAN  2,780,990
PARIMUTUEL TICKET PRINTING MACHINE
Filed June 25, 1949  10 Sheets-Sheet 4
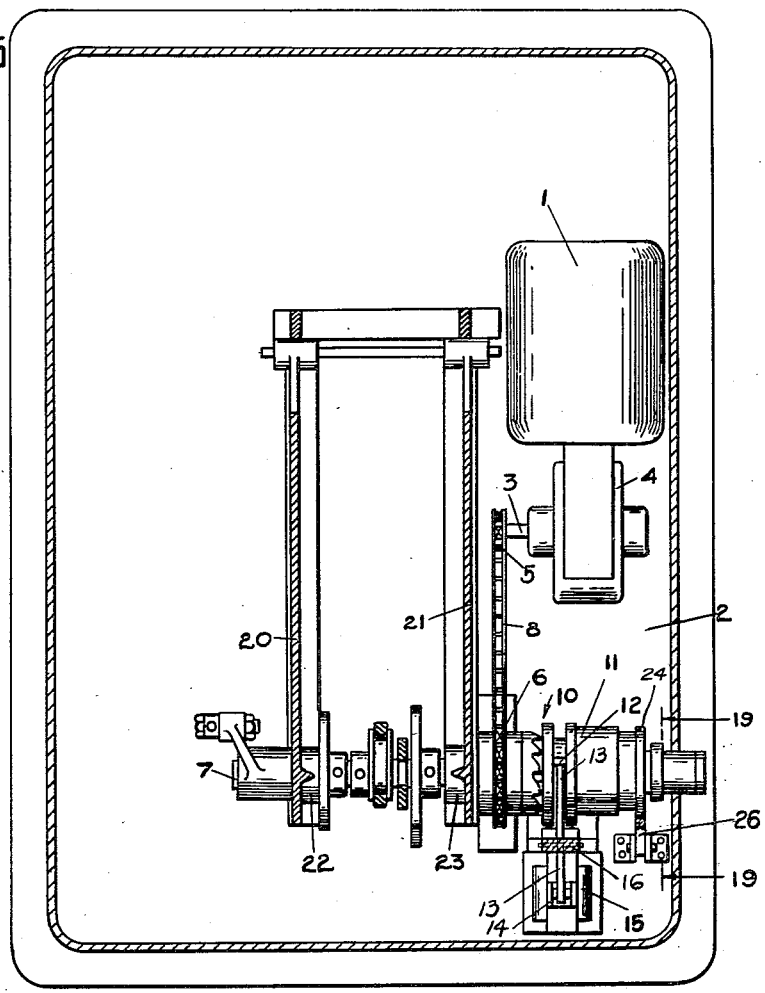
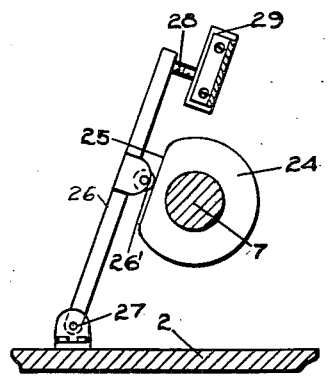
INVENTOR.
ARNOLD B. GERHAN
BY
ATTORNEYS

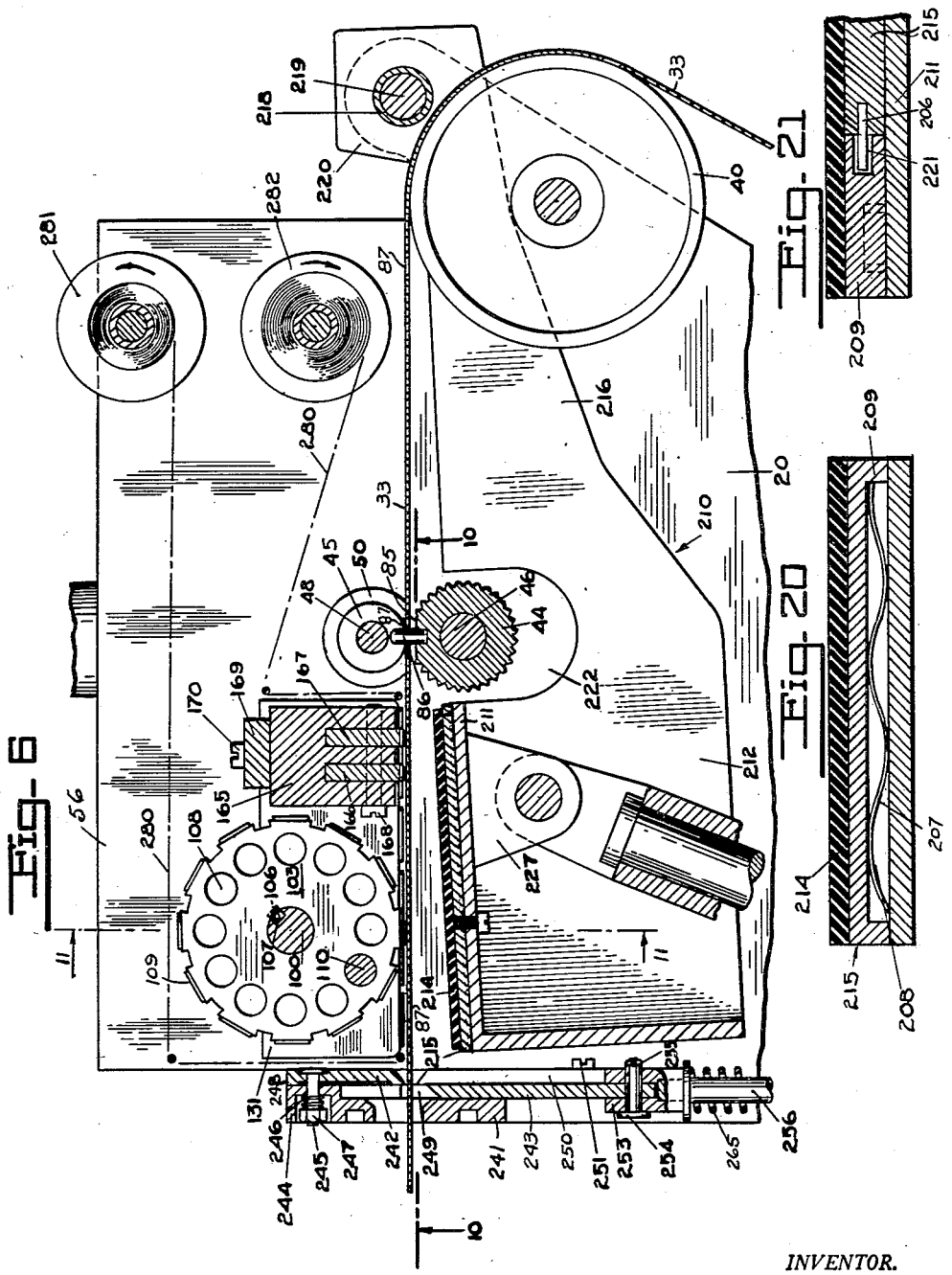

Feb. 12, 1957  A. B. GERHAN  2,780,990
PARIMUTUEL TICKET PRINTING MACHINE
Filed June 25, 1949  10 Sheets-Sheet 6

INVENTOR.
ARNOLD B. GERHAN
BY
Boyken, Mohler & Beckley.
ATTORNEYS

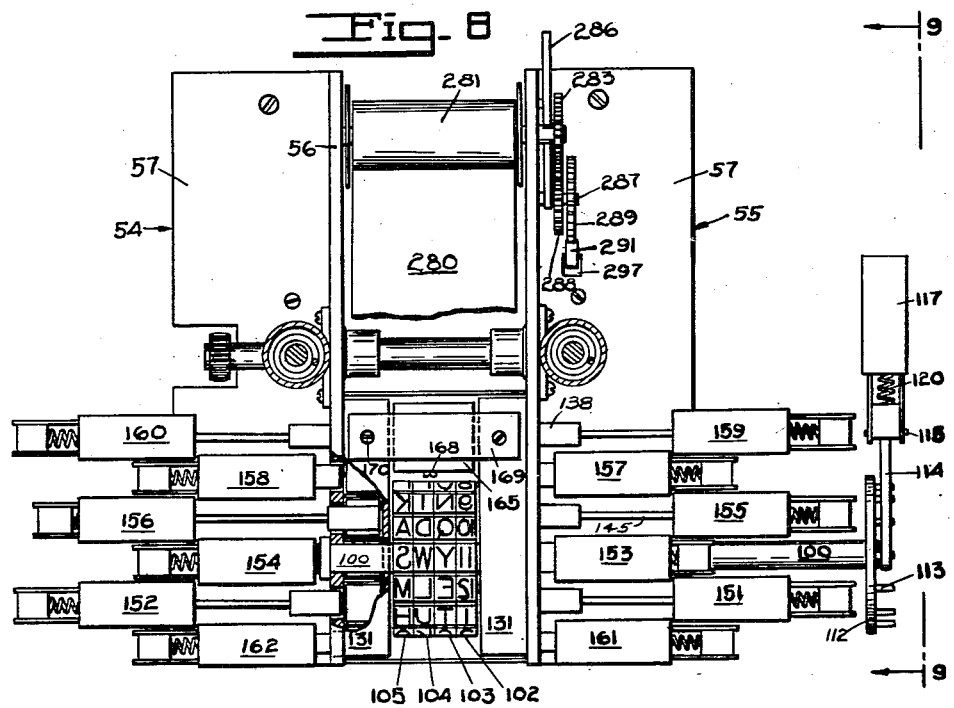
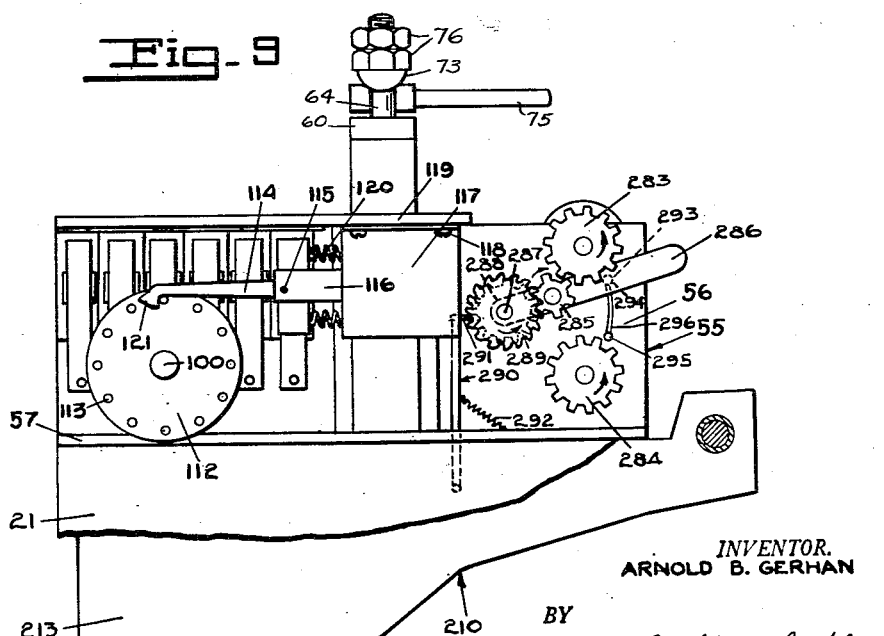

Feb. 12, 1957 A. B. GERHAN 2,780,990
PARIMUTUEL TICKET PRINTING MACHINE
Filed June 25, 1949 10 Sheets-Sheet 8
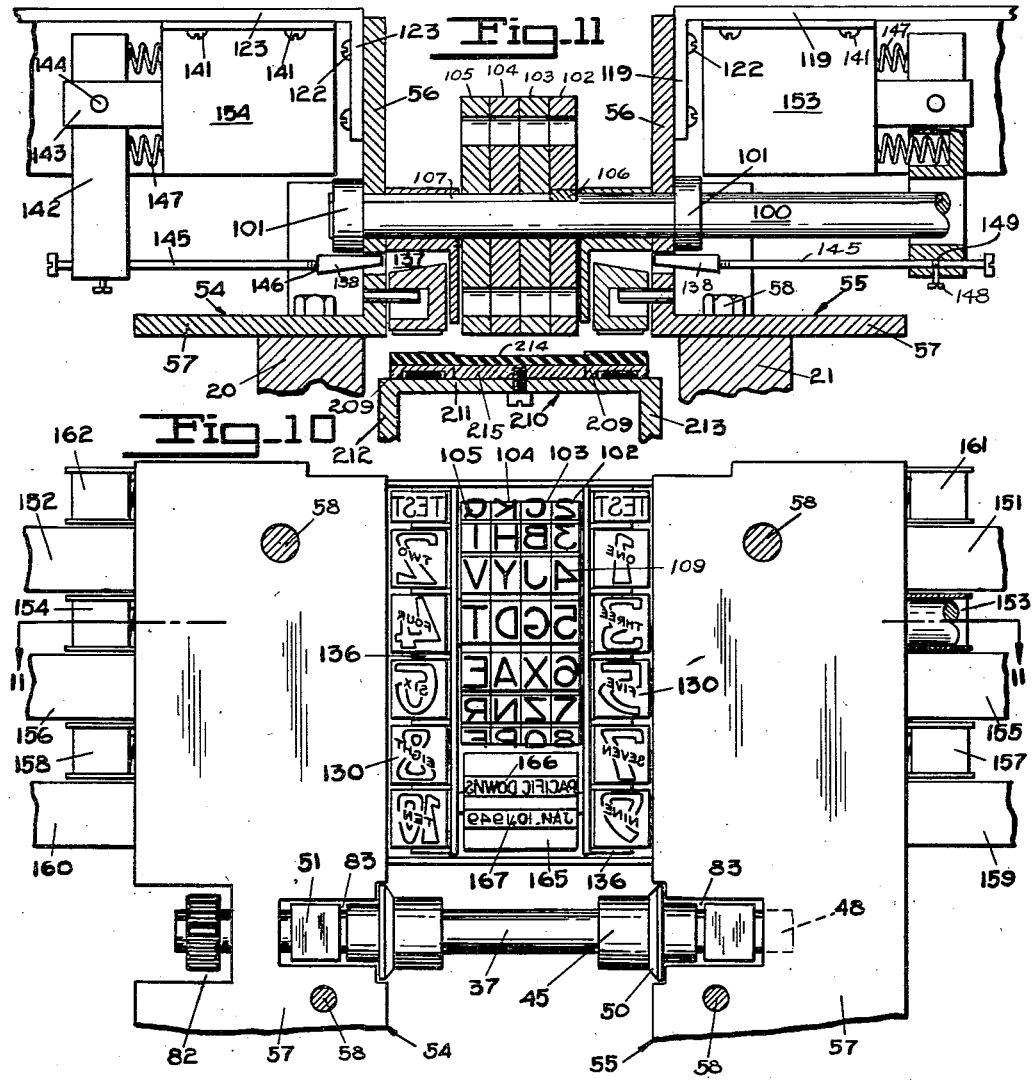
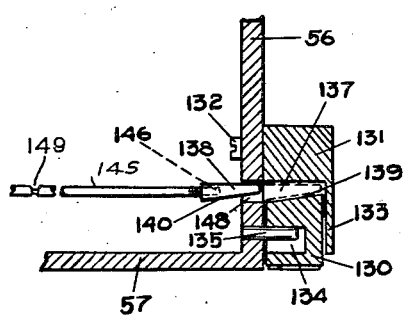
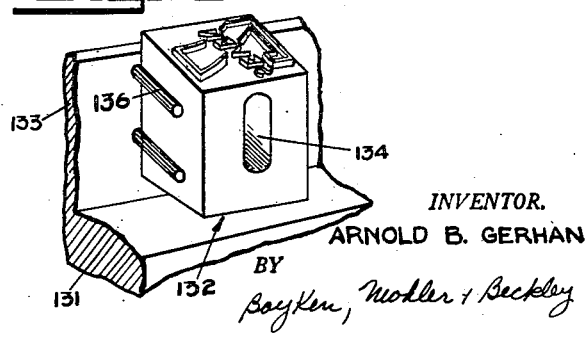
INVENTOR.
ARNOLD B. GERHAN
BY
Boyken, Mohler & Beckley
ATTORNEYS

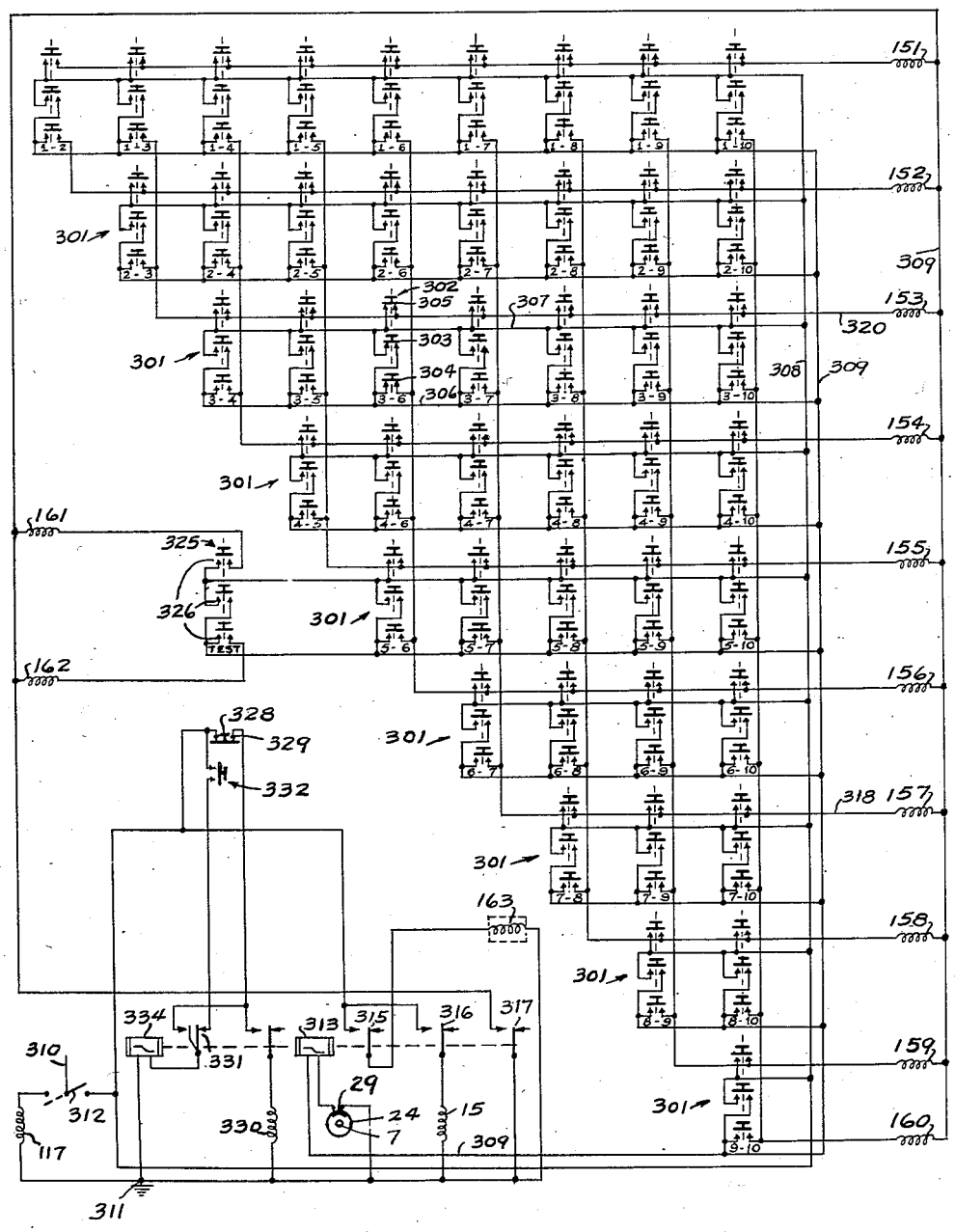

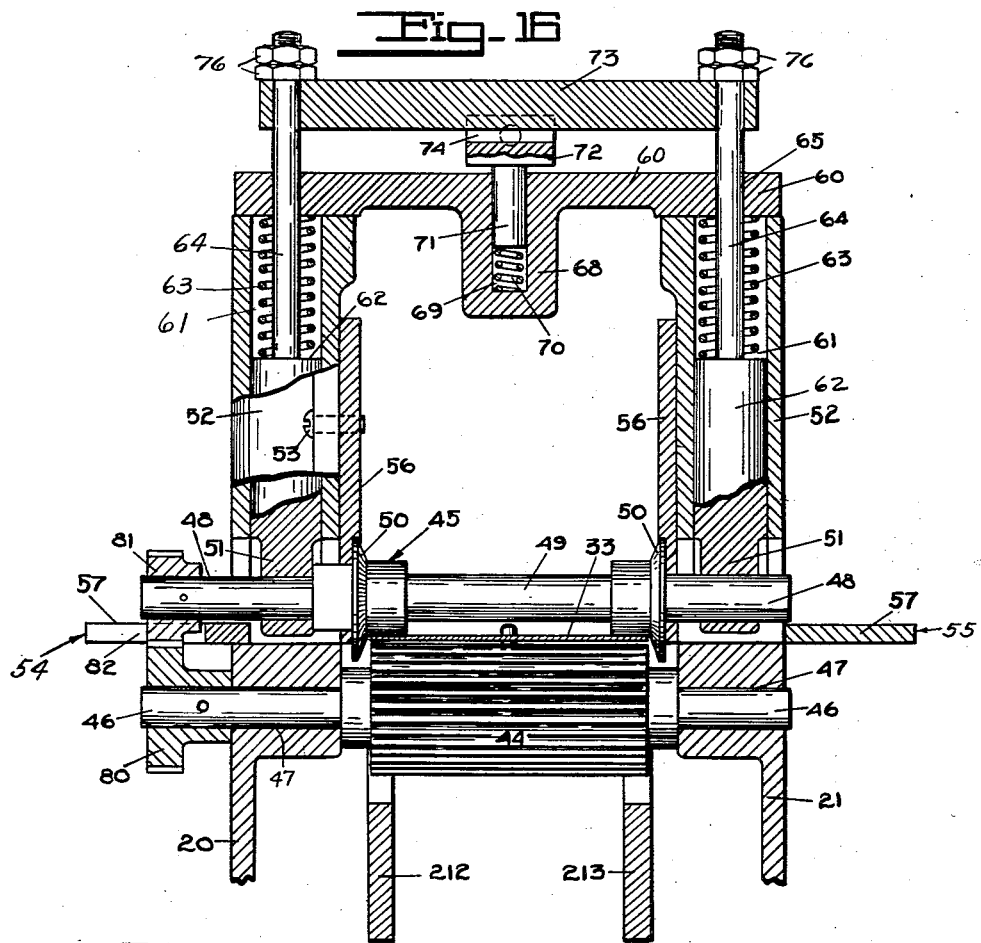
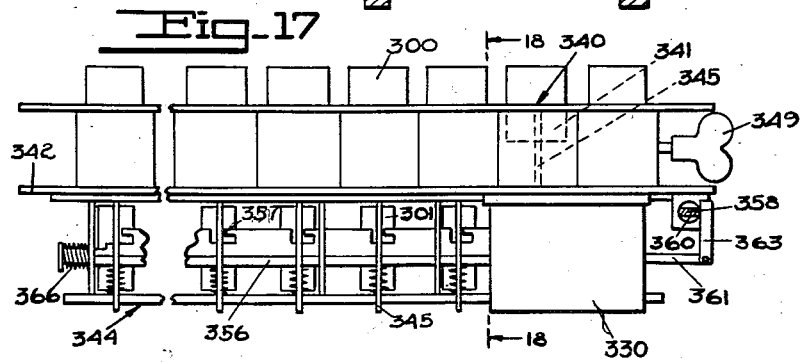
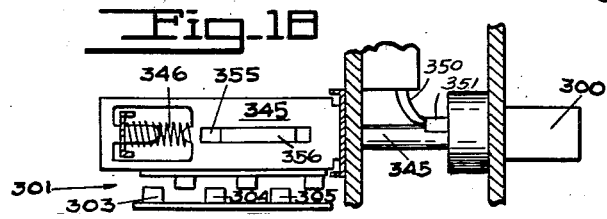
INVENTOR.
ARNOLD B. GERHAN

United States Patent Office 2,780,990
Patented Feb. 12, 1957

2,780,990

PARIMUTUEL TICKET PRINTING MACHINE

Arnold B. Gerhan, San Francisco, Calif.

Application June 25, 1949, Serial No. 101,428

14 Claims. (Cl. 101—93)

The present invention relates to ticket printing and issuing machines which are adapted to be used in connection with betting on races or similar contests which are conducted under the so-called "parimutuel" system.

This invention is adapted for use with the so-called "Daily Double" type of ticket. Under the "Daily Double" system tickets are normally sold only in connection with two separate races, such as the first two races of the day or the first and third races of the day.

In addition to use in connection with the "Daily Double," the present invention contemplates the provision of a machine particularly adapted to be used for printing and issuing "Quiniela" tickets. In the "Quiniela" type of betting the selection of two entries in one race is made as opposed to the selection of two entries in two races as in "Daily Double." Thus the purchaser of a "Quiniela" ticket indicates to the operator of the machine the two entries of any race which he believes will take first and second place in the event for which the ticket is purchased. For the ticket to be a winner both entries must either take first or second place although the order in which such places are taken is not considered. It will be apparent that the odds are very great in such a system and that the mechanical means for registering the various combinations of all of the entries in a race taken two at a time is much more complicated than the corresponding means employed for regular races.

It is therefore one of the objects of the present invention to provide a relatively simple device for printing and issuing "Quiniela" tickets and which device may be readily converted to a "Regular" machine for printing and issuing a conventional ticket when desired.

Another object of the invention is the provision of a light-weight machine which may be readily carried about and transported from one place to another. In this connection it is pertinent to note that such machines are relatively expensive and require careful handling during transportation. Since machines of the class described must, of necessity, be transported great distances between the sites of different events, transportation costs become appreciable and in some instances may prevent economical amortization of a machine which is not compact and relatively light in weight. By a unique construction which permits employing electrical means for performing some of the operations of the machine which have heretofore been performed mechanically, the present invention contemplates the provision of a machine which is not subject to the disadvantages heretofore inherent in machines of like nature.

Still another object of the invention is the provision of a ticket printing and issuing machine which may be speedily operated by means which are adapted to be controlled by keys on a keyboard as distinguished from controls requiring levers which must be manually operated by the operator in charge. The speed with which tickets must be issued will be appreciated when it is considered that the tickets issued for any event must be sold before the event starts and that provision must be made for locking the machine so that no tickets may be issued after an arbitrarily arranged time before the event commences.

Still another object of the invention is the provision of a ticket printing and issuing machine which permits remote control of the same so that many machines may be locked from a central station as desired.

And yet another object of the invention is the provision of a unique arrangement of type elements which lends itself to rapid control and which is relatively simple to make and operate. This arrangement of type element is employed in connection with the printing of the numerals designating the entries for which any ticket is to be issued.

One embodiment of the present invention is disclosed in the accompanying drawings from which, together with the specifications, other objects and advantages will be apparent.

In the drawings:

Fig. 1 is a perspective view of the invention showing the rear or keyboard side of the machine.

Fig. 2 is a perspective view of the invention showing the front or ticket dispensing side of the machine.

Fig. 3 is a vertical transverse sectional view of the machine taken in a plane adjacent the ticket dispensing side of the mechanism, showing the mechanism in elevation and the housing in section and the keyboard elements partly broken away for clarity. Part of the base of the machine is broken away to conform to the size of the sheet.

Fig. 4 is a vertical longitudinal sectional view through the machine as taken substantially along the lines 4—4 of Fig. 3 but showing the switch and counter mechanisms in elevation.

Fig. 5 is a horizontal section view of the main driving mechanism only as taken substantially along the lines 5—5 of Fig. 4.

Fig. 6 is an enlarged vertical longitudinal section view of the printing head of the mechanism and showing the ticket strip feeding mechanism and the ribbon feeding mechanism.

Fig. 8 is a top plan view of the printing head of the invention with solenoid support brackets removed for clarity and partly broken away and in section to show the action of the solenoid arms for selecting the type elements having the characters to be printed on the ticket. The solenoids are indicated schematically for clarity.

Fig. 9 is a side elevational view of the printing head as taken along lines 9—9 of Fig. 8.

Fig. 10 is an enlarged horizontal sectional view through the mechanism as taken along lines 10—10 of Fig. 6 showing the various printing elements of the head.

Fig. 11 is a cross-sectional view through the printing head as taken along lines 11—11 of Figs. 6 and 10.

Fig. 12 is a fragmentary sectional view through the printing head showing a detail of one of the type elements with an associated solenoid arm and wedge.

Fig. 13 is a perspective view of the type element adapted to mark the ticket for entry No. 7.

Fig. 14 is an elevational view of a $2.00 "Quiniela" ticket representing a bet on horses 3 and 6 and having code No. 5 GDT printed thereon. The serial number of the ticket is 444.

Fig. 15 is a wiring diagram of the electrical system of the invention.

Fig. 16 is a transverse cross-sectional view showing the ticket strip feed rollers and the associated mechanism supporting the bearings of the upper feed roller shaft.

Fig. 17 is a sectional view of the keyboard and its associated mechanism as taken along lines 17—17 of Fig. 4.

Fig. 18 is a sectional view of the keyboard as taken along lines 18—18 of Fig. 17.

Fig. 19 is a vertical sectional view through the main drive shaft of the invention showing the mechanism for breaking the relay circuit.

Fig. 20 is a longitudinal cross-sectional view through a side section of the platen.

Fig. 21 is a fragmentary transverse cross-sectional view through the platen.

Driving mechanism

Figure 7:
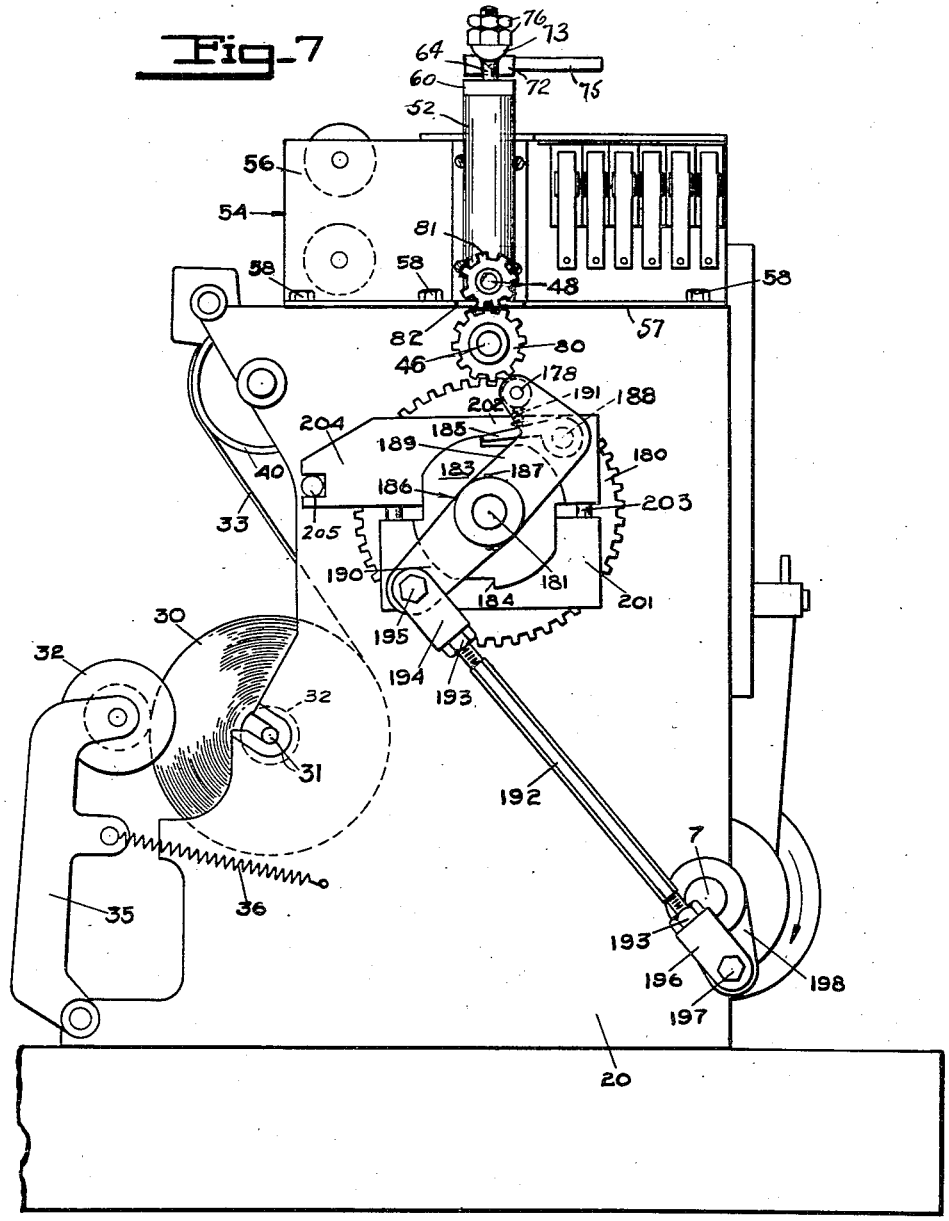
Fig. 7 is a vertical longitudinal sectional view of the mechanism of the machine only as taken along lines 7—7 of Fig. 3.

The power required for the operation of all of the mechanical elements of the machine except the ticket number selection device, is obtained from an electric motor 1 which may be mounted on the base 2 of the machine (Fig. 5). The motor 1 drives a shaft 3 through a reducer 4 which may be of the type having its housing integral with that of the motor 1. A sprocket wheel 5 on shaft 3 and a sprocket wheel 6 on the main shaft 7 are operatively connected by means of chain 8. The sprocket wheel 5 is preferably somewhat smaller than the sprocket wheel 6 so that the speed of rotation of the main shaft 7 is still further reduced from the speed of shaft 3.

Rotatably supported on the main shaft 7 and driven by sprocket 6 is a clutch member 10 which rotates continuously as long as the motor 1 is energized (Figs. 3, 5). Driven clutch member 11 is rigidly secured to shaft 7 and carries a clutch pin 12 slidably received in the periphery of clutch member 11 for movement in a direction axially of shaft 7 and into engagement with the teeth of clutch member 10. The clutch pin 12 (Fig. 5) is formed with a cam surface (not shown) intermediate its length cooperating with lever 13 which in turn is pivotally connected to the extension 14 of the armature of a solenoid 15. As best seen in Fig. 3, the lever 13 is pivotally connected to a bracket 16 which in turn is rigidly secured to the base 2. An extension spring 17 extending between bracket 16 and the solenoid armature extension 14 serves to force the lever 13 downwardly against the clutch member 11 when the solenoid 15 is not energized. In this latter position the lever 13 effects the withdrawal of clutch pin 12 from the teeth of the clutch member 10 and also prevents further rotation of driven clutch member 11 by engagement with the pin 12 carried by clutch member 11. Energizing of the solenoid 15 causes engagement of pin 12 with one of the teeth of the clutch member 10 and rotation of clutch member 11 until the lever 13 engages the pin 12. No claim is made herein to the clutch construction and any conventional single revolution clutch may be employed in lieu of that shown.

For the purpose of deenergizing the solenoid 15 after the trip lever 13 has been withdrawn from the clutch member 11 and thereby permit engagement of the trip lever 13 with the clutch pin 12 after one revolution of the shaft 7, a relay is provided having a switch 29 which is opened by partial revolution of shaft 7 after the solenoid 15 is energized (Fig. 19). A cam 24 is rigidly secured to the shaft 7 of the clutch member 12 and is provided with a flat portion 25. A cam follower 26' is rotatably mounted on an upwardly extending arm 26 which arm is pivotally secured adjacent its lower end to the base 2 as by pin 27. Adjacent the upper end of arm 26 is a contact 28 adapted to engage a corresponding contact on switch 29 which switch may be fastened to the side of the casing.

The angular displacement of the flat portion 25 on cam 24 with respect to the clutch pin 12 is such that the clutch solenoid is energized only during a relatively small angle of rotation of shaft 7 thereby permitting return of the trip lever 13 downwardly into engagement with the clutch member 11 and subsequently engagement with clutch pin 12 after one revolution of shaft 7. The interconnection between switch 29 and solenoid 15 will subsequently be described in detail in connection with the electrical system.

Positioned approximately centrally of the base 2 and extending upwardly therefrom are a pair of identical frame members 20, 21 spaced longitudinally of shaft 7 and provided respectively with hubs 22, 23 in which the shaft 7 is rotatably received (Fig. 3). The shaft 7 is adapted to actuate the various devices for moving the ticket strip and printing and cutting the same. These devices will each be subsequently described in detail.

Ticket strip feeding means

Referring to Figs. 4, 6, 7 it is seen that the roll 30 of ticket strip material is supported between the frames 20, 21 by means of shaft 31 on which the ticket strip spool 32 is rotatably mounted. To prevent over-running of the roll 30 and to obviate the development of slack in the ticket strip 33 due to the inertia of the roll 30, a brake generally designated 34 is provided (Fig. 4). This brake 34 comprises a generally vertical frame 35 pivotally mounted at 39 to frames 20, 21 adjacent their lower ends and yieldably connected intermediate its ends to the frames 20, 21 by means of extension springs 36 (Figs. 4, 7). A spool 37 is rotatably connected to the upper end of frame 35 and engages the surface of the roll 30 at all times regardless of the size of the roll. Thus the springs 36 retard the rotation of the roll 30 and prevents objectionable over-running of the ticket strip 33.

Rotatably mounted between frames 20, 21 adjacent their upper ends is an idler drum 40 which is positioned so that its upper edge is tangent to the horizontal run of ticket strip 33 and during which horizontal run the printing operations are performed in a manner to be subsequently described in detail.

As best seen in Figs. 6 and 16, the movement of the ticket strip 33 along the horizontal printing run is accomplished by a pair of feed rollers 44, 45 mounted transversely of the length of the ticket strip 33. The lower roller 44 is rigidly secured to shaft 46 which in turn is journalled in bores 47 formed in frame members 20, 21 (Fig. 16). The upper roller 45 is formed integrally with a shaft 48 and has a central portion 49 somewhat smaller in diameter than roller 45 for a purpose to be subsequently described. The roller 45 has a pair of spaced flanges 50 adapted to prevent transverse movement of ticket strip 33 while the strip is being fed by rollers 44 and 45 between the flanges 50.

The shaft 48 which carries the roller 45 is journalled in a pair of bearing pieces 51 slidable in uprights 52 which in turn are secured as by screws 53 to the upstanding legs 56 of a pair of angle shaped frame extensions 54, 55 mounted on frame members 20, 21 respectively. As may be seen in Figs. 7, 10, the horizontal legs 57 of the extensions 54, 55 are secured by means of bolts 58 to the frame members 20, 21. The uprights 52 are connected by means of bridge member 60 which may be rigidly secured to the upper ends of the uprights as by welding. Each upright 52 is provided with a longitudinally extending bore 61 (Fig. 16) within which a cylindrical piston 62 secured to each bearing piece 51 is slidably received. A compression spring 63 within each bore 61 bears against the bridge member 60 (Fig. 16) and the upper end of each cylindrical portion 62 thus urging the shaft 48 downwardly at all times. Extending upwardly from the pistons 62 are rods 64 which are coaxial with springs 63 and which pass through holes 65 in bridge piece 60. A hub 68 is provided centrally of the bridge piece 60 and is vertically bored as at 69 for a portion of its depth to provide a retainer for a spring 70. Slidable within bore 69 is a cylindrical extension 71 of a disk-shaped cam 72. The spring 70 urges this cam 72 upwardly against a rod 73 which is vertically spaced from and parallel to the bridge member 60. This rod is semi-circular in cross-section with its flat side facing upwardly (Fig. 7). The upper face of the cam 72 is provided with a V-shaped groove 74 the horizonal extent of which is shown in Fig. 16 and which groove is adapted to engage the lower circular side of the rod 73. The cam 72 is provided with a horizontally extending handle 75 (Figs. 7, 9), for rotating the cam 72 for moving the rod 73 upwardly out of the groove 74 against the action of springs 63. The rod 73 may be adjustably secured to the rods 64 by means of nuts 76. Thus it is seen that the roller 45 may be readily released from gripping engagement with the ticket strip 33 for feeding a new ticket strip between the rollers 44, 45 or for making other adjustments which require that the ticket strip be free for longitudinal movement.

The feed rollers 44, 45 are driven by a pair of coacting pinions 80, 81 (Figs. 7, 16) which are respectively secured to the ends of shafts 46, 48 adjacent the frame member 20. Since the effective diameter of roller 45 is somewhat less than that of roller 44 the number of teeth in pinion 81 is correspondingly less than the number of teeth in the pinion 80 so that the peripheral speed of both rollers will be equal. The horizontal leg 57 of frame extension 54 is cut away as at 82 (Figs. 7, 10) to clear pinion 81 and the horizontal legs 57 of both frame extensions 54, 55 are cut away as at 83 to clear the bearing pieces 51. The pinion 80 is rotated in a manner to be subsequently described so that for each ticket issued by the machine the roller 44 will be rotated one revolution. As may be seen in Figs. 6, 16 the roller 44 is longitudinally fluted around its circumference to provide the requisite friction to pull the ticket strip 33 against the braking effect of the brake 34. A portion of the circumference of the roller 44 is cut away however to produce a relatively narrow flat 85 (Fig. 6) which is formed without flutes. When this flat 85 comes to a position adjacent the roller 45 the gripping action of the rollers on ticket strip 33 ceases. Secured to the roller 44 and projecting radially outwardly therefrom is a pin 86 positioned centrally of the flat 85 and adapted to succesively enter longitudinally spaced holes 87 formed in the ticket strip centrally of the same (Fig. 14). The action of the pin 86 is as follows: When the gripping action of rollers 44, 45 ceases as above described, the pin 86 will have entered hole 87 in the ticket strip so that continued rotation of the roller 44 in a counterclockwise direction as seen in Fig. 6 will cause the strip to move to the left under the action of the pin 86 until the strip 33 is again gripped between the fluted portion of the roller 44 and the roller 45. As hereinafter described, the means for driving the roller 44 is such that the roller 44 will be driven through a relatively small angle after the fluted portion of the roll starts to grip the ticket strip before the ticket strip stops its forward motion at which time at ticket is severed from the ticket strip. The above described mechanism insures that the printing operation will be performed centrally of each ticket and that each ticket will be severed at the same point along the length of the ticket relative to the holes 87. If no means were provided for engaging the ticket strip at the same point with reference to the circumference of roller 44 it is obvious that uniformity of the issued tickets would be practically impossible of attainment. The reduced diameter of the central portion 49 of the roller 45 permits the pin to penetrate the ticket strip 33 without engaging the roller 45.

*Printing mechanism*

As may be seen in Figs. 4, 6, 8, 9 and 11 a shaft 100 is supported for rotation on the frame extensions 54, 55 transversely of the horizontal run of the ticket strip 33. This shaft 100 is mounted in bearings 101 (Fig. 11) and extends horizontally outwardly from frame extension 55 to the right as seen in Figs. 3, 8, 10 and 11. Secured to shaft 100 intermediate the frame extensions 54, 55 are printing elements 102, 103, 104, 105 (Figs. 10, 11) in the form of discs having around their periphery printing indicia 109 (Fig. 10) which are adapted to mark the printing strip 33 when brought into printing relation with the latter in a manner to be subsequently described in detail. The printing element 102 is provided with a central bore and a key 106 rigidly secured to the element 102 and extending into the bore so that said key may enter a complementary keyway 107 in the shaft 100 (Fig. 6).

As best seen in Fig. 6, each of the printing elements 102–105 is provided adjacent its periphery with an annular row of bores 108 parallel to shaft 100 and equal in number to the number of printing characters 109 on the periphery of each printing element. Secured within one of these bores on printing element 102 is a pin 110 which is adapted to pass through one of the bores 108 on each printing element 103, 104, 105. Since the printing element 102 may be secured to the shaft 100 by means of key 106 each of the other printing elements 103, 104, 105 may be secured relative to printing element 102 in any relationship desired thus providing a large number of combinations of four character indicia. The characters on printing elements 102, 103, 104 and 105 may be employed for printing on each ticket a code number or symbol of which the first character is preferably a number representing the race for which the ticket is issued. The letter characters are thus changed for each race thereby making forgery of a ticket almost impossible. The printing elements may be arranged with respect to each other each day before the racing starts and no subsequent change is required between races.

For the purpose of rotating shaft 100 so that the numeral representing any race may be brought into printing relation with respect to the ticket strip 33, an effective arrangement is provided which permits immediate change from one race to another whenever desired. A selector wheel 112 (Figs. 8 and 9) is secured to the end of the extension of shaft 100 and carries adjacent its periphery an annular row of axially extending pins 113 projecting outwardly from the surface of the wheel and parallel to the shaft 100. The number of pins 113 is equal to the number of characters on each of the printing elements 102–105.

These pins 113 are adapted to be successively engaged by a generally horizontally disposed detent 114 pivotally secured as at 115 to the armature 116 of a solenoid 117 (Fig. 9). Thus it is seen that upon energizing the solenoid 117 the armature 116 and detent 114 will be drawn toward the solenoid causing rotation of the selector wheel 112. The solenoid 117 may be adjustably secured relative to the mounting bracket 119 by means of screws 118 and the travel of the armature 116 may be predetermined so that the printing elements 102–105 will be rotated one character at a time into printing relationship to the ticket strip 33. The solenoid 117 is provided with compression springs 120 for urging the armature outwardly of the solenoid at all times so that upon de-energizing the armature the detent 114 will be returned to engage the next pin 113. The end of the detent 114 is tapered as at 121 to permit the detent to swing slightly upwardly for engagement with the pins 113.

The mounting bracket 119 which serves to support the solenoid 117 is in the form of an angle shaped member having a relatively long horizontally extending leg to the under side of which the solenoid 117 is secured along with other solenoids to be subsequently described (Fig. 11). The vertical leg of the mounting bracket 119 is secured to the upstanding leg 56 of the frame extension 55 by means of screws 122 as best seen in Fig. 11.

A mounting bracket 123 is secured to frame extension 54 in a manner similar to that employed for securing mounting bracket 119 to frame extension 55. Both brackets 119 and 125 serve to support along the undersides of their horizontally extending legs a bank of solenoids for a purpose which will now be described in detail.

As best seen in Figs. 10 and 11 a plurality of type elements 130 are positioned adjacent the lower edges of the upstanding legs 56 of frame extensions 54 and 55. Twelve such type elements are shown, although it is obvious that more or less may be employed if desired. Ten of these type elements preferably carry characters indicating the numerals identifying various horses or entries in any given race or event. Two of the type elements are inscribed with the word "Test," and these elements are employed to mark the issued tickets when the latter are being printed to check the performance of the machine. The even numerals are preferably arranged in a row of five or more along the frame extension 54 while the odd numerals may be arranged in a row of five or more along the frame extension 55 as shown in Fig. 10. However, any interchange of combinations may be made as desired.

A backing strip 131 (Fig. 12) is secured along each upstanding leg 56 of frame extensions 54, 55 between said legs and the printing elements 102–105. These backing strips are secured to the upstanding legs 56 by means of screws 132 and are provided with depending flanges 133 which serve to retain the elements 130 against lateral movement transversely of the ticket strip 33. Each element is vertically slidable between upstanding legs 56 and the flanges 133 for movement toward and away from the ticket strip 33. As best seen in Fig. 13 (in which view the type element is shown inverted) each type element is provided with a vertical slot 134 in the side of the element which is adjacent the legs 56. Pins 135 secured to and projecting outwardly from the legs 56 are adapted to enter slots 134 to limit the vertical travel of the type elements 130 (Fig. 12). Cylindrical spacers 136 are secured at right angles to the flanges 133 and extend substantially to legs 56 but are spaced slightly therefrom as shown in Fig. 10. These spacers 136, two of which are preferably positioned between adjacent type elements as shown in Fig. 13, are spaced longitudinally of each row of type elements 130 so that each type element is slidably received between adjacent pairs of spacers 136. The arrangement of backing strip 131, pins 135 and spacers 136 is an important feature of the present invention and permits the type elements 130 to be positioned in printing position by gravity (or by a spring if desired) and at the same time prevents movement of the type elements in any direction other than vertical. The above described arrangement of type elements 130 permits the printing surfaces of the type elements 130 and the printing surfaces of the disk-shaped printing elements 102–105 to be arranged in coplanar relationship so that when an upwardly directed pressure is exerted against the type elements by means of a platen in a manner to be subsequently described the ticket strip 33 will be inscribed and also embossed with whatever indicia are on the elements 102–105 and with the indicia on whatever type elements 130 that are prevented from moving upwardly.

For the purpose of selectively preventing upward movement of the type elements 130 as desired I provide a bank of wedges 138 on each side of each leg 56 of frame extensions 54 and 55. These wedges 138 are adapted to be reciprocated transversely of the legs 56 into the space between the type elements 130 and the backing strip 131 when the type element 130 is in its lowermost position (Fig. 12). Each type element is formed substantially to the shape of a cube except that the face 139 opposite the printing face is biased as shown in Fig. 12 to correspond with the tapered sides 140 of the wedges 138 so that when the wedge 138 is inserted into the space 137 between the face 139 of the type element 130 and the lower side of the backing strip 131 upward movement of the type element 130 is positively prevented until the wedge 138 is removed.

Each wedge 138 is operatively connected to one of a bank of solenoids 151–160. These solenoids are numbered on the drawings (Figs. 8, 10) to correspond with the numerals on the type elements 130 which they are adapted to actuate. For example, solenoid 154 actuates the type element 130 which prints the numeral "4," and solenoid 160 actuates the type element 130 which prints the numeral "10." Solenoid 161 actuates the "Test" type element 130 that is in the row of odd numbered characters while solenoid 162 actuates the "Test" type element 130 that is in the even numbered row (Fig. 10).

The solenoids 152, 154, 156, 158, 160 and 162 are secured to the mounting bracket 123 by means of screws 141 and the solenoids 151, 153, 155, 157, 159, 161 are similarly secured to the mounting bracket 119 which also serves to support the solenoid 117 as hereinbefore described (Fig. 8). As best seen in Fig. 11, each solenoid 151–162 is arranged so that its armature 143 projects horizontally outwardly of the solenoid in a direction away from the printing head of the machine. Rigidly secured at right angles to the outer end of each armature 143 as by rivet 144 is a vertically disposed link 142. This link 142 is bored transversely at its lower end to receive a connectiong rod 145 therethrough, and this rod extends horizontally towards the printing head and is threaded adjacent its free end as at 146 to engage a threaded hole in wedge 138 for removably securing the latter to the connecting rod 145. A set screw 148 in the lower end of the link 142 engages an annular groove 149 in connection rod 145 thereby effecting a stop so that the travel of the wedge into the space 137 may be adjusted as desired by rotating the connecting rod 145 thereby permitting accurate predetermination of the density of characters printed on the ticket strip 33. Furthermore, this adjustment permits compensation for variations in the platen surface due to wear.

For the purpose of urging the armature outwardly of the solenoid when the latter is not energized a pair of compression springs 147 are provided in each solenoid and which springs urge the links 142 away from the solenoid at all times. Thus upon energizing the solenoid in a manner which will subsequently be described in detail the link 142 will be drawn towards the solenoid against the force of the springs 147 thus causing the wedges 138 to be inserted into the spaces 137 to prevent upward movement of the type element 130 with which the solenoid is connected. A series of holes 148 (Fig. 12) may be provided in the legs 56 of frame extensions 54, 55 to permit the movement of the wedges 138 therethrough (Fig. 12). Upon deenergization of the solenoid the springs 147 will force the link 142 outwardly thereby removing the wedges from the space 137. In this connection it is preferable that the positioning of the wedge 138 be such the leading edge of the wedge 138 remain in the hole 148 in the leg 56 when the solenoid is deenergized thus providing a guide for said wedge.

The preferred arrangement of the solenoids 151–162 is as seen in Fig. 8 where the solenoids in each bank are staggered with respect to the adjacent solenoids that a more compact arrangement is effected. This feature is important because the size of the ticket issued by the machine is directly proportional to the spacing of the type elements 130 and if the ticket is not to exceed a reasonable length the solenoids 151–162 must be compactly arranged. Of course "rotary" type solenoids or specially designed push-botton solenoids may be employed which permit closer spacing but since solenoids of the "rotary" type are relatively more expensive than the conventional solenoids, illustrated in the drawings, the arrangement herein illustrated is preferred in most cases. It should be understood of course that the length of connecting rods 145 must be varied to suit the position of any solenoid with respect to its associated type element 130.

As may be seen in Fig. 14, which shows a portion of the ticket strip 33 constituting an issued ticket, the date and the name of the track from which the ticket is issued are printed centrally of the ticket adjacent its lower edge. Since the date need only be changed once each day a more permanent means may be provided for printing this material on the ticket. As best seen in Fig. 6, a type block 165 is provided between the rollers 44, 45 and the printing elements 102-105. This block is transversely slotted to receive a pair of printing elements or slugs 166, 167 one of which carries the name of the track and the other the date. These elements 166, 167 may be centrally apertured to receive a screw 168 which screw may be threaded to engage a complimentarily threaded hole in the block 165. A cross piece 169 is rigidly secured to the top of the block 165 transversely of the printing head so that the entire printing unit may be releasably secured to the backing strips 131 by means of bolts 170 (Fig. 8).

Referring to Fig. 14, it is seen that the code letters "5 GDT" have been printed by the disk-shaped elements 102-105 positioned as shown in Fig. 10. The entry numbers "3" and "6" have been printed by the type elements 130 bearing the corresponding indicia when the latter are retained in their "down" position by solenoids 153 and 156 respectively. These solenoid armatures are shown energized in Fig. 8 for printing the ticket illustrated in Fig. 14. The track name "Pacific Downs" and the date "January 10, 1949" have been printed by the type elements 166, 167 respectively as indicated in Fig. 14.

*Intermittent ticket feeding device*

The means for driving the rollers 44, 45 is illustrated in Fig. 7 wherein the pinions 80, 81 are shown secured to the ends of shafts 46, 48 respectively which shafts in turn support the rollers 44, 45. Meshing with the gear 80 is a gear 180 which is rotatably supported on shaft 181 carried in bearings 182 formed on the frame members 20, 21 (Fig. 7). The shaft 181 extends parallel to the axis of the feed rollers 44, 45. The gear 180 carries a central hub 183 integral therewith and this hub 183 is formed with teeth 184 for engagement by the ratchet pawl 185 (Fig. 7). Upon the end portion of shaft 181 a rocker lever generally designated 186 is fastened by pin 187 through the hub of said lever. The pawl 185 is pivotally supported on a pin 188 fastened to one arm 189, of the rocker lever 186. This arm 189 which supports the pawl 185 is L-shaped and carries at the extremity of the laterally extending portion a pin 178 to which is secured a spring 191 for urging the pawl 185 into engagement with the periphery of hub 183 at all times. In the embodiment shown there are four teeth 184 on the hub 183. By means subsequently to be described, the rocker lever 186 is caused to rotate clockwise through an angle slightly greater than 90° so that the pawl 185 engages the next tooth 184 and then the direction of rotation of the rocker lever 186 is reversed causing the pawl to rotate the hub 183 through 90° to the position shown in Fig. 7. The ratio of the number of teeth on the gear 180 to the number of teeth on the pinion 80 is 4 to 1 hence the gear 80 and the roller 44 to which it is connected will rotate one revolution for each quarter turn of the hub 183 in the manner hereinbefore described.

The angular reciprocating movement of the rocker lever 186 is effected by means of a connecting rod 192 which is pivotally secured to the end of arm 190 on the rocker lever 186 which arm is opposite from the arm 187 which carries the pawl 185. The connecting rod 192 is provided at its ends with right and left hand threads and lock nuts 193. Threadedly secured to the upper end of connecting rod 192 is a connecting piece 194 which in turn is pivotally secured to arm 190 by means of bolts 195. The lower end of connecting rod 192 is provided with a similar connecting piece 196 which is pivotally secured by bolt 197 to crank 198 which in turn is rigidly secured to main shaft 7 for rotation therewith.

Referring to Fig. 7, it will be apparent that one complete revolution of shaft 7 will cause the rocker lever 186 to rotate through approximately 90° and permit the pawl 185 to engage the next tooth 184 and then rotate the hub 183 through 90° in a counterclockwise direction to the position shown in Fig. 7. Thus one revolution of the main shaft 7 will cause on complete revolution of the pinion thereby effecting a complete rotation of the feed roller 44.

The above described arrangement for driving pinion 80 permits the feeding of a ticket for each rotation of the shaft 7. The operation of the clutch 11 as hereinbefore described limits rotation of the shaft 7 to one revolution so that the intermittent action of the roller 44 is uniform for each rotation of the shaft 7. The other cycles of operation such as the actuation of the platen and the means for cutting the strip 33 are also performed with reference to one rotation of shaft 7; these cycles will subsequently be described in detail.

For the purpose of preventing over-running of the hub 183 and to insure uniformity of the cycles performed by the mechanism connecting shaft 7 to the pinion 80 a brake is provided on the ratchet hub 183 (Figs. 3, 7). This brake comprises a pair of corresponding plates 201, 202 bored to fit the ratchet hub 183 on the portion thereof between the ratchet teeth 184 and the gear 180 as shown in Fig. 3. By means of screws 203 greater or less frictional pressure may be brought upon the ratchet hub 183 to prevent movement of the ratchet hub as the pawl 185 is moved clockwise as shown in Fig. 7 and at the same time prevent over-running of the hub 183 when the same is rotated in a counterclockwise direction by said pawl. The plate 202 has a portion 204 extending horizontally outwardly therefrom to engage a pin 205 rigidly secured to the frame member 20 for the purpose of positively preventing any rotational movement of plates 201, 202 at any time. It will be apparent that the frictional resistance offered by the brake plates 201, 202 may be adjusted by means of screws 203 to achieve the resistance desired to the rotation of the ratchet hub 183 in a counterclockwise direction as seen in Fig. 7 and to prevent any rotation in a clockwise direction.

*Platen and means for actuating the same*

As best seen in Figs. 6, 11 a platen generally designated 210 is provided under the ticket strip 33. This platen 210 is adapted to press said ticket strip against the various type members hereinbefore described at certain intervals. The inking ribbon and its operation will subsequently be described in detail. The platen 210 has a transverse upper section 211 having depending therefrom a pair of ribs 212, 213 which are rigidly secured to the section 211 along the longitudinally extending sides of the latter (Fig. 11). A pressure pad 214 of moderately hard rubber or the like is secured to the top side of section 211. If desired a removable head 215 may be removably secured to the section 211 in any convenient manner and the pressure pad 214 may be fastened to this head. This provision of a removable head permits speedy replacement of the pressure pad when desired without the necessity of removing the platen from the machine. A pair of arms 216, 217 which may be extensions of ribs 212, 213 respectively extend rearwardly from the platen and are pivotally supported by means of bearings 218 on a shaft 219 extending transversely between frame members 20, 21 and secured to a pair of ears 220, 221 which are extensions of frame members 20, 21 respectively. The arms 216, 217 are recessed adjacent their junction with ribs 212, 213 as indicated at 222 on Fig. 6 to permit the platen to clear the feed roller 44. As may be seen in Fig. 6, the axis of the shaft 219 should be in a plane coinciding with the plane of the horizontal run of the ticket strip 33 or slightly above said place so that the pressure exerted by the pressure pad 214 is normal to the plane of the printing faces of the characters on the type element hereinbefore described.

With particular reference to the type 30 (Figs. 10-13) it will be understood that the pins 135 limit the downward movement (as seen in Fig. 12) of the type 130 and permit a substantial upward movement of said type. Thus the flanges 133 and pins 135, 136, in effect, floatingly support the type 130 for vertical reciprocating movement. Upward movement of type 130 is not positively provided for but such movement will occur when the platen 210 is swung upwardly against the coplanar printing faces of these type 130 which are not held by wedges 138.

In operation, upon upward movement of platen 210, the type 130 which are held by wedges 138 will be prevented from moving upwardly and will effectively print on the material between the printing faces and pressure pad 214. The floatingly supported type which are not so held will be free to move upwardly and will engage the material to be printed with a force equal to only the force of gravity on said type. Such force is not sufficient to effect visible printing.

The adjustment of the type elements 130 with respect to the platen 210 by means of connecting rod 145 is sufficient, in most cases, to insure uniform density of the indicia made by the various printing elements. It is understood, of course, that the printing elements 102–105 are not adjustable with respect to the platen but any adjustment required may be made in the elements 130 and also the thickness of the removable head 215 may be varied as required. However, I have found that additional adjustment is desirable in some cases when the above described means is not sufficient to insure proper printing. For this purpose the removable head 215 may be split lengthwise of the printing run to form two side sections 209. These sections 209 may be formed with downwardly opening recesses 208 for receiving flat springs 207 (Fig. 20). These springs bear against the transverse platen section 211 and urge the side sections 209 upwardly at all times. From Fig. 11 it will be apparent that the pressure pad 214 is thus in effect divided into three integral but relatively movable portions. Two of these portions engage the two rows of type elements 130 while the center portion engages the printing elements 102–105. To prevent relative movement of the sections 209 with respect to the main section 215 in excess of the small amount normally required, horizontally outwardly extending pins 206 are secured to the central section 215 of the head and recesses 221 (Fig. 21) are formed in the side sections 209 for receiving the pins 206. The recesses 221 are vertically elongated to permit a slight movement of sections 209 with respect to the head 215 and at the same time prevent complete separation of the side sections.

The above arrangement provides an effective means for adjusting the density of the printing characters to attain the desired degree of uniformity when such uniformity might otherwise be impossible to achieve. The strength of springs 207 may be varied as desired thus providing an additional adjustment.

Referring to Fig. 4, it is seen that a reciprocating pivotal movement of platen 210 is effected by means of a connecting rod 223 which is eccentrically connected to shaft 7. This connecting rod 223 is provided at its upper end with a head 224 and the end of the connecting rod 223 adjacent this head 224 is slidably received in a hub 225 which in turn is provided with a yoke 226 which is pivotally connected to lug 227 on platen 210 by means of pin 228. The lower end of the connecting rod 223 is threaded so as to be screwed into hub 230 of the eccentric strap 231 which in turn is mounted on an eccentric 232 rigidly secured to the main driving shaft 7. The connecting rod 223 is threaded intermediate its ends for a pair of lock nuts 233 which serve to support a washer 234 against axial movement along the connecting rod 223. A compression spring 235 surrounds the connecting rod 223 and bears axially at its upper and lower ends against the lower end of hub 225 and the washer 234 respectively. The spring 235 serves to urge the hub 225 upwardly at all times thereby causing the head 224 to bear against the upper end of the hub 225. However, upon movement of the platen upwardly against the printing elements the connecting rod 223 will slide in the hub 225 when the compressive force of the spring is exceeded by the axial force exerted on the connecting rod by the eccentric 232. It will be readily apparent that the spring 235 serves to measure the force exerted against the printing elements and prevents this force exceeding a predetermined limit which limit is adjustable by means of nuts 233.

The platen 210 in Fig. 4 is shown in its uppermost position in printing relation to the printing elements and the eccentric 232 preferably is in a position about 90° from its stopped position. The eccentric therefore will rotate during rotation of the shaft 7 through an angle of about 270° from the position shown in Fig. 4 to the stopped position, stopping of the shaft being effected as above described by the trip lever 13 engaging the clutch pin 12 (Fig. 5). When the platen is in the uppermost position as shown in Fig. 4, the crank 198 (Fig. 7) will be approximately 125° from the position shown in Fig. 7 in the direction of the arrow with the pawl 185 moving toward the next tooth 184 in a clockwise direction toward the position shown in Fig. 7. When the eccentric has moved through approximately 90° from the position shown in Fig. 4 in the counterclockwise direction, thus moving the platen 210 approximately half way to its lowermost position, the pawl 185 will have engaged the next tooth in a clockwise direction from the position shown in Fig. 7, and started rotation of the hub 183 counterclockwise in Fig. 7 to effect feeding movement of the rollers 44, 45. When the pawl 185 again has reached the position shown in Fig. 7, the feeding movement of the rollers 44, 45 will have been completed. During this movement the platen will have continued its movement to its lowermost position and will have returned part way upwardly toward the stopped position. Because of the angular displacement of crank 198 on shaft 7 in relation to the eccentric 232 and in consideration of the kinematic relations of the connecting rod 223, rocker lever 186, ratchet teeth 184 and the arrangement and adjustment of the trip lever 13 for operation of the clutch pin 12 and the clutch member 11, the feeding movement of the rollers 44, 45 under the actuation of the crank 198 will be completed prior to the completion of the full rotation of the eccentric 232 and the pawl 185 will have started again to move in the clockwise direction in Fig. 7 toward the position of engagement of the next tooth 184 of the ratchet hub 183 when rotation of the shaft 7 is stopped. Moreover, the feeding movement of the strip will be initiated only after completion of the printing indicia thereon. After completion of this feeding movement of the strip it will be in the position for cutting the printed portion or ticket therefrom. All of these movements and operations will be begun and completed within the cycle represented by the single revolution of the shaft 7 under the control of the one revolution clutch.

*Ticket cutting device and means for operating the same*

Fastened to the vertical forward edges of the frame members 20, 21 by screws 240 (Fig. 3) a knife frame 241 is provided which serves to support the cutting knife blades 242, 243 in shearing relation to each other upon vertical relative movement thereof. The knife blade 242 as shown in Figs. 3, 6 is stationary and is supported above the horizontal plane in which the strip 33 is pulled with the planar face of the cutting edge vertical and with the body of the knife to the right of this vertical plane as shown in Fig. 6. Through the upper transverse portion 244 of the knife frame 241 and through the upper part of the blades 242, a pair of bolts 245 are passed and the transverse portion 244 is recessed to receive nuts 247. The bolts 245 are provided with springs 246 bearing between the nuts 247 and the recessed portions of the transverse portion 244 of the knife frame 241. By means of the nuts 247 the bolts 245 are rigidly fastened to the knife blade 242. This knife blade is provided with a fulcrum edge 248 bearing along a horizontal line on the face of the transverse portion 244 of the knife frame 241. Since the cutting edge of the blade 242 as seen in Fig. 6 is on the forward edge of the same it will be apparent that blade 242 will remain in contact with the blade 243 as wear occurs between the two blades due to shearing action. The blade 243 is provided with an upwardly projecting lug 249 (Fig. 6) which maintains the planar faces of the blades substantially in the same vertical plane and prevents the blade 242 from moving forwardly or to the left as seen in Fig. 6 when, as shown in this figure, the cutting edge of blade 243 is separated from and below the cutting edge of blade 242 to permit passage of the strip 33 therebetween.

The blade 243 is reciprocably movable in the vertical direction. In Fig. 6 the outer or left hand face of this blade bears against a surface of the knife frame 241. At the opposite face of the blade 243 and engaging the vertical edge portions thereof guide plates 250 are fastened to the frame 241 by means of screws 251. The top edges of these guide plates 250 are bevelled in the opposite direction to the bevel of the knife blade 242 so that the severed end of the strip 33 of the portion extending beyond the printing elements 102—105 is engaged by these bevelled portions after the blades have closed and thus is prevented from substantial movement upwardly or downwardly which might be caused by any tendency of the strip to curl or bulge or by the action of gravity. The strip thereby is maintained in its position for projection between the blades when they are separated by the mechanism about to be described.

At the lower end of the blade 243 a yoke 253 is fastened by a headed pin 254 (Fig. 6) retained in place by cotter pin 255. The yoke 253 is fastened at the end of rod 256 which extends through a lug 257 (Fig. 3), which is formed at the upper end of a connecting guide member 258. The rod 256 is fastened in the lug 257 by nuts 259 threaded on the rod 256 at opposite sides of the lug 257 to provide for adjustment of the connecting guide member 258 relative to the knife blade 243 and to a cam 260 fastened upon the shaft 7 for rotation therewith, this cam being engaged by cam roller 261 carried on a pin 262 fastened in the lower end of the connecting guide member 258. This connecting guide member as may be seen in Fig. 4 is formed with a portion 263 projecting upwardly along the rear side of shaft 7 to form an open slot on the guide member which provides for sliding movement of the connecting guide member 258 relative to the shaft 7 to guide the lower end of this member 258 and to prevent movement laterally of its length while permitting movement lengthwise thereof. As shown in Fig. 4 the axis of the rod 256 is substantially in a vertical plane which contains the axis of the shaft 7 and vertical movement of the knife blade 243 therefore is effected substantially parallel to the plane of the cutting face of the blade 243 when the cam roller 261 is moved downwardly in following the cam surface of cam 260 upon rotation of the shaft 7.

Surrounding the rod 256 and bearing at its upper end against the yoke 253 and at its lower end against a transverse portion 266 of the knife frame 241 a compression spring 265 is provided which is effective to urge the knife 243 and the connecting guide member 258 upwardly. The cam roller 261 thereby is maintained in a camming relation to the cam surface of the cam 260. Upon rotation of the shaft 7 in the counter-clockwise direction as shown in Fig. 4, the cam 260 will gradually move the knife blade 243 downwardly until the toe 267 of the cam 260 passes the roller 261 at which moment a quick reverse movement of the knife blade 243 is effected under the force of the compression spring 265. This quick reverse movement upwardly in relation to the fixed knife blade 242 severs the strip which in the meantime has been projected by the feeding movement of rollers 44, 45 as above described between the knives in their separated relations.

The cam 260 is fastened upon the shaft 7 in such angular relation to the eccentric 232 for operating the platen 210 as well as to the crank 198 (Fig. 3) for operating the feed rollers that when the platen is in the printing position as shown in Fig. 4 the roller 261 has been moved somewhat downwardly from the position at the completion of the upward movement of the knife blade 243 effecting the cutting of the strip 33. This slight movement is caused by the gradual curve of the cam as may be seen in Fig. 4 substantially from the low point of the toe 267 at the radius extending horizontally to the right in this figure to the point at the radius extending vertically downwardly. This 90° of rotation corresponds to the 90° of rotation of the eccentric 232 as above described. During the further rotation of the cam 232 through approximately 50°, further rise of the cam surface produces further downward movement of the blade 243 to the position in which it is fully separated from the blade 242. Thereafter, through a rotation of approximately 190°, the cam surface provides a dwell and the knife blade 243 is maintained in its lowermost position. Immediately thereafter the toe 267 passes the roller 261 and during the remaining 30° of the revolution of the cam the knife blade is quickly returned upward to effect shearing the strip 33. The angular relation of the toe 267 of the cam 260 to the crank 198 for driving the feed rollers 44, 45 is such that this quick return of the knife takes place after the pawl 185 has reached the position shown in Fig. 7 and has completed forward movement of the strip 33 and has moved at least a few degrees therefrom in the regular recovery movement of the pawl 185 about the axis of shaft 181.

For the purpose of separating the knife blades 242, 243 to permit adjusting the strip 33 and for determining the relation of the strip 33 and its perforation 87 to the pin 86 of the feed roller 44 and for other adjustments, a lever 270 (Fig. 3) is pivotally supported on the knife frame 241 by screw 271. This lever is formed with a toe 272 which engages the upper edge of the connecting guide member 258 to press this guide member downwardly against the force of the spring 265 when the right hand end of the lever 270 is moved downwardly as seen in Fig. 3. Such operation of the lever 270 is effective to move the knife blade 243 downwardly to bring its cutting edge below the cutting edge of the knife blade 242 to separate these blades. When not in use spring 273 holds the lever 270 out of engagement with guide member 258.

*Inking ribbon feeding mechanism*

The mechanism for supporting and feeding the inking ribbon and for effecting reversal of the direction or movement of the ribbon is shown in Figs. 6, 8 and 9. The inking ribbon 280 is wound on upper and lower ribbon spools 281, 282 respectively, which in turn are journalled in the upwardly extending legs 56 of angles 54, 55. The shafts of spools 281 and 282 extend horizontally outwardly of the leg 56 of angle 21 and gears 283 and 284 are respectively secured to these shafts. The gears 283, 284 are adapted to be alternatively driven by pinion 285 journalled on arm 286. This arm 286 is pivotally secured at one end to the leg 56 of angle 55 by means of pin 287. Rotatably secured to pin 287 are gear 288 and ratchet wheel 289 which are preferably integrally connected. The gear 288 is adapted to drive pinion 285 and the ratchet wheel 289 is adapted to be intermittently rotated by arm 290 connected to platen 210. The arm 290 (Fig. 9) is generally vertical and has at its upper end a lateral extension 291 which engages the teeth of ratchet wheel 289. A spring 292 extending between the arm 290 and the horizontal leg 57 of angle 55 serves to urge the arm 290 toward the ratchet wheel at all times. In operation, the oscillatory motion of the platen 210 causes rotation of the ratchet wheel 289 in a counter-clockwise direction as seen in Fig. 9, thus driving the gear 283 in the same direction through pinion 285.

When it is desired to rotate the spool 282 the arm 286 is swung downwardly from the position shown in Fig. 9 so that the pinion 285 engages the gear 284 thus driving the spool 282 counter-clockwise and reversing the direction of movement of the inking ribbon 280. To positively hold the arm 286 so that the pinion 285 is either in engagement with gear 283 or gear 284 a spherical projection 293 on arm 286 is provided which alternately engages spherical recesses 294 and 295 on leg 56 of angle 55 depending on whether gear 283 or gear 284 is to be driven. An arcuate groove 296 is also provided on the leg 56 of angle 55 for guiding the projection 293 between the recesses. The leg 57 of angle 55 is apertured as at 297 (Fig. 8) to permit passing of arm 299 therethrough (Fig. 9).

*Electrical control system for quiniela*

The printing elements 130 (Fig. 12) each of which represents an entry in the event for which tickets are to be issued are adapted to be selectively engaged by wedges 138 actuated by solenoids 151—162 as hereinbefore described (Fig. 15).

Referring to Fig. 1 it is seen that forty five keys of the 48 shown and generally designated 300 are provided each of which represents by number two entries for the particular event. As hereinbefore noted as many printing elements 130 (Fig. 10) as desired may be arranged in printing relationship to printing strip 33. However, only 12 elements have been illustrated in the drawings since the "Quiniela," for which the present invention is particularly adapted, is not normally applied to races having more than 10 or 12 entries. As previously described, two of the twelve printing elements 130 are marked "Test" and do not represent entries. It will be apparent that the forty five numbered keys 300 represent ten entries taken two at a time without regard to order. If the invention were applied to issuing "Quiniela" tickets for nine entries there would be thirty six keys 300 and if for eight entries there would be twenty eight keys 300 and so on.

As may be seen by reference to the electrical wiring diagram Fig. 15, the keys 300 are adapted to actuate switches 301 each of which has six normally open contacts for the purpose of closing various controlled circuits as will be described. In the explanation of the electrical operation of the invention it will be assumed that the key representing entries 3 and 6 has been depressed to issue the ticket illustrated in Fig. 14. Upon depressing the key 300 which designates the entries 3 and 6, the switch 302 will be closed so that contacts 303, 304 and 305 will each complete circuits as follows: contacts 303 connect by leads 306 and 307 the circuits 308 and 309 to a source of power 310 and ground 311 respectively; assuming the switch 312 in the power line to be closed. A relay 313 in the circuit 309 is energized thereby closing the switches 315, 316, 317, the function of which will subsequently be described. Indicated schematically on Fig. 15 is the main machine shaft 7, the cam 24 and the switch 29 which opens the relay circuit upon a fractional revolution of shaft 7, thereby breaking the control circuit current with contactors instead of on the more delicate push button key mechanism.

It will be apparent that the closing of switch 316 will energize the machine clutch solenoid 15 thereby starting the shaft 7 on its one complete revolution as previously described in connection with the main driving mechanism.

Contacts 304 which are closed simultaneously with contacts 303 will connect by leads 307 and 318 the circuits 308 and 319 to the power supply 310 and the ground 311 respectively; assuming the switch 317 to have been closed by relay 313 as above described. The solenoid 156 which is in the circuit of lead 318 will thus be energized thereby inserting the wedge 138 into the opening 137 between the printing element 130, representing the numeral "6," and the backing strip 131 as previously described (Fig. 12).

Practically simultaneously with the closing of contacts 303 and 304 the contacts 305 will be closed thereby connecting lead 320 with the source of power in like manner as lead 318 is connected. Within the circuit of lead 320 is the solenoid 153 which when energized actuates wedge 138 associated with the type element 130 which carries the numeral "3" (Fig. 12).

Inasmuch as the relay 313 will become deenergized after a relatively small rotation of the shaft 7 which in turn will open the normally closed contacts 29 (Fig. 15) it will readily be apparent that the raising of the platen 210 to print the ticket must be performed immediately upon commencement of the machine cycle initiated by the depressing of the key 300 otherwise the deenergizing of the relay 313 by continued rotation of the shaft 7 will open the switch 317 effecting the withdrawal of wedges 138 from the openings 137 prior to printing the ticket. It will be understood that after the deenergizing of the relay 313 and the opening of switches 315, 316, 317 the motor will continue rotation of shaft 7 for one complete revolution of the same thereby effecting the operations of feeding the strip and cutting the same as previously described.

Also indicated on Fig. 1 is the "Test" key designated 325. As seen in Fig. 15, this key 325 serves to close the switch contacts 326 which causes energizing of solenoids 161 and 162 in a manner similar to that explained above in connection with switch 302, thus permitting the normal cycle of the machine to be performed to issue a ticket with the words "Test" thereon in lieu of the regular ticket.

A key having the word "Lock" thereon is shown on the keyboard illustrated in Fig. 1 and indicated at 328. This key opens the switch 329 which may be the same as the other switches actuated by the keys 300 to permit uniformity but which may be provided with modified contacts as shown in Fig. 15 to have only one set of normally closed contacts. This switch 329 when opened serves to physically lock the machine so that the keys 300 may not be depressed. The method of preventing the depression of keys 300 will subsequently be described in detail but in this connection the solenoid 330 (Figs. 4, 15) is employed to actuate the means for thus locking the machine. A conventional "Make before break" switch 331 is employed to permit locking of the machine locally at the machine while a switch 332 is placed in the circuit containing the switch 331 so that after the machine is locked it can be opened only by depressing the switch 332 which may be positioned in a station remote from the machine to prevent unauthorized issue of tickets. When solenoid 330 is energized from switch 332 effecting a holding circuit for relay 334 through switch 328 the machine is open for operation.

It is to be understood that the switch contacts shown in heavy black lines in Fig. 15 where switch 302 is represented, are omitted from the other switches in the same drawing for clarity. The terminals for all switches are shown, and each switch is adapted to be closed and opened by switch contacts as indicated in heavy black lines in the representation of switch 302.

As indicated in Fig. 15, switches 301 are each gang operated so that all six of the contacts carried by each switch are closed simultaneously. It will be noted that switch 302, the operation of which has heretofore been described in detail, is only one of 45 switches which are required for a ten entry Quinilla Keyboard. If it were desired to print a ticket with three entries printed thereon, it is obvious that the arrangement required would be merely an extension of the invention herein described in detail. For example: an additional pair of contacts on switch 302 and the appropriate wiring therefor would permit the printing of an additional entry on the ticket 33—say entry No. 7. Thus what is known in racing parlance as a "3, 6 and 7 tie-up" may be effected. Of course, additional keys 300 or contact arrangements would be required.

Another feature of the invention derived from the unique arrangement of the type 130 is that the machine may be employed to "wheel a number." Thus the operator may "wheel number 3" with the other combinations by printing tickets bearing the numbers 3, 1; 3, 2; 3, 4; 3, 5; and so on.

Still another feature of the machine is that it may be employed to print the conventional Win, Place and Show tickets, by employing an interchangeable key board. In such a case only one type element would be used on each ticket.

As the ticket 33 is issued upon the completion of the machine cycle, provision is made for total-counting all of the tickets issued by the machine. Switch 315 in conjunction with relay 313 energizes an electro-magnetically operated counter 163 which indicates the total number of tickets issued (Fig. 15).

For automatically advancing the race and code wheels indicated by 102, 103, 104 and 105 (Figs. 10, 11) more specifically shown as 5 GDT on the ticket 33 (Fig. 14) a double throw interlocking switch 312 (Fig. 15) is provided for energizing the race and code wheel solenoid 117. This prevents unauthorized race changes while the machine is in operation.

*Keyboard and associated mechanism*

As best seen in Figs. 4, 17 and 18 a keyboard generally designated 340 is provided having apertures in which the keys 300 are slidable. These keys 300 which are preferably rectangular in cross section are provided with integral cylindrical bosses 341 which bear against the inside face of the keyboard 340 when the keys are in their normal position. Spaced inwardly of the keyboard 340 and parallel thereto is a switch base 342 which serves to support the switches 301. This switch base 342 is fastened to the inner ends of flanges 343 which extend inwardly of the casing and preferably at right angles thereto. On the side of the switch base 342, remote from the keyboard 340, the switches 301 are arranged in four horizontal rows of twelve switches each. Each row of switches is secured to a conventional switch frame 344 (Fig. 17) which in turn is secured to the base 342. As best seen in Fig. 17, switch rods 345 are slidably supported within the frames 344 for movement in a direction perpendicular to base 342 and coaxial with keys 300. These switch rods 345 carry the switch elements which engage the contacts 303, 304 and 305 (Fig. 15) to close the various circuits as explained in connection with the wiring diagram. The outwardly projecting ends of the switch rods 345 engage the bosses 341 so that upon depressing a key 300 the switch rod 345 of the associated switch 301 moves longitudinally of its length against the resistance of compression spring 346 to complete the circuits mentioned above. Upon release of the key 300 by the operator, the spring 346 returns the switch rod 345 until the boss 341 of the key 300 engages the keyboard 340 preventing further movement of switch rod 345 and at which time the contacts of the switch 301 are open.

Conventional counters 348 are also secured to the switch base 342 for the purpose of registering the number of times any key 300 is depressed during a given period of time thus providing a means for accurately recording the number of tickets issued for any combination of two entries. It will be understood that the amount to be paid for a winning ticket bears a direct relation to the number of winning tickets. These counters 348 are arranged in four banks of twelve each so that one counter is positioned above the corresponding key and each counter in a bank is secured to its adjacent counter so that each bank may be installed as a unit.

The shaft of the counter wheels in each counter is secured to the shaft of the adjacent counter so that all the counters may be turned back to "zero" by a wing nut 349 (Figs. 4 and 17) secured to the shaft of one of the last counters in each bank. In the drawings these wing nuts 349 are positioned on the ends of the banks of counters which are to the right of the keyboard as shown in Fig. 17. Each of the counters 348 is provided with a depressible arm 350 which is normally in the "up" position as shown in Fig. 4 to which position it is urged by a spring within the counter (not shown). Upon depressing one of the keys 300 the counter arm 350 is engaged by a projection 351 secured to switch rod 345 and extending transversely outwardly therefrom. Simultaneously with the longitudinal movement of switch rod 345 to close the switch 301 the counter registers a unit count. Upon release of the key 300 the counter arm 350 is returned upwardly by the counter spring as explained above.

For the purpose of permitting determination of the number of tickets sold at any time during a period of sale and at the completion of such a period, openings 353 are provided in the casing (Fig. 1) which openings register with the dial of the counter so that the number 354 registered by the counter 348 may be viewed through said openings.

As best seen in Figs. 17 and 18 each switch rod 345 is provided with a rectangular aperture 355 centrally of the rod and through which a locking bar 356 is adapted to be positioned perpendicular to the switch bar 345. Such a locking bar 356 is provided for each of the four rows of switches 301 so that one locking bar 356 engages twelve switch rods 345. Referring to Fig. 17 in which the locking bar is shown in its unlocked position, it is seen that each locking bar is provided with projections 357 which are adapted to enter the apertures 355 when the locking bar 356 is moved longitudinally of its length to the left as seen in Fig. 17. In this latter position the projections 357 prevent movement of the switch bar 345 and the switch is locked.

For the purpose of locking each switch 301 the locking rod of each switch frame is connected adjacent one end of the keyboard to a common operating rod 358 which rod is rotatably supported in bearings 359 secured to the switch base 342. This operating rod 358 is positioned parallel to the switch base 342 and is provided with a longitudinally extending flat portion 360 which engages the transverse projections 361 integral with the ends of the locking bars 356. Thus, when the projections 361 are in engagement with the flat portions 360 of rod 358 as shown in Fig. 4, it is apparent that a slight rotation of rod 358 will move the locking bars 356 longitudinally of their lengths. By properly proportioning the diameter of the operating rod 358 and the flat portion 360 with respect to the travel of locking bar 356, it is seen that the four locking bars may be moved to the left as shown in Fig. 17 to cause the projections 357 to enter the apertures 355 in switch bars 345 thus locking all of the switches 301.

As best seen in Figs. 4 and 17, the rotation of the operating rod 358 is accomplished by means of a solenoid 330 which has been formerly described in connection with the wiring diagram. Secured to the rod 358 adjacent its upper end is a crank 363 to the free end of which is secured the armature 364 of solenoid 330 (Fig. 4). The armature 330 is fastened to the switch base 342 and is preferably positioned on the side of the operating rod 358 which is towards the switch frames 344 so that the required width of the machine is not unduly enlarged.

The solenoid 330 is preferably energized when the machine is unlocked as shown in Fig. 17. Upon deenergizing of the solenoid 330, springs 366 which are provided on the switch frames 344 coaxial with the locking bars urge the locking bar to the left as seen in Fig. 17 thereby locking the machine as described above.

It should be understood that although the switches 301 and the counters 348 are preferably arranged in banks for convenience all of the switches or counters indicated need not be utilized. For example the counter corresponding to the "Lock" key 328 of Fig. 1 may be rendered inoperative if desired and also the counter corresponding to the "Test" key 325 of Fig. 1. In like manner all of the keys 300 need not be operatively connected to their corresponding counters. Thus the key 324 indicating "Total" may be a dummy since, as pointed out in connection with the wiring diagram, the "Total" counter is actuated by the solenoid 163 and not by the key 324 (Figs. 1, 15).

I claim:

1. In a ticket printing and dispensing machine, a printing mechanism comprising a platen and a plurality of printing type having coplanar printing faces, said type being spaced from said platen for insertion of the ticket to be printed between said faces and said platen, means for selectively supporting certain only of said type and said platen for relative movement of said platen and said certain of said type into effective printing relation of said faces with said ticket at the plane of said coplanar faces for printing on said ticket by said faces, said type being arranged in spaced rows, means for supporting said ticket in a position for printing of said faces of said coplanar type along the marginal portions of said ticket, annular rows of type supported over said ticket, the printing faces of certain only of the type of said annular rows being in a printing position coplanar with the printing faces of said spaced rows of type for printing simultaneously with said last mentioned faces, and means supporting the type of said annular rows for movement to said printing position as desired.

2. In a ticket printing and dispensing machine, a printing mechanism comprising a platen and a plurality of printing type having printing faces arranged substantially coplanar on a common printing plane, said type being spaced from said platen for positioning a ticket to be printed between said faces and said platen, means supporting said type in coplanar relationship but permitting reciprocable movement from the plane of their printing faces in a direction at right angles to said plane, holding means comprising holding elements supported for movement into and out of engagement with said printing type for selectively holding any desired type from said movement away from said plane and means for moving said platen toward said type to cause printing on said tickets by the faces of the type held by said holding means.

3. In a ticket printing and dispensing machine, a printing mechanism comprising a platen and a plurality of printing type having printing faces, said type being spaced from said platen for positioning a ticket to be printed between said faces and said platen, means supporting said type in coplanar relationship for reciprocable movement relatively to and from the plane of their printing faces in a direction at right angles to said plane holding means for selectively holding any desired type from said movement away from said plane, and means for moving said platen toward said type to cause printing on said tickets by the faces of the type held by said holding means, said holding means comprising holding elements supported for movement into and out of engagement with said type, and means including finger operated keys bearing indicia corresponding with the printing faces of said type, for so moving said holding elements.

4. In a ticket printing and dispensing machine, a printing mechanism comprising a platen and a plurality of printing type having printing faces, said type being spaced from said platen for positioning a ticket to be printed between said faces and said platen, means supporting said type in coplanar relationship for reciprocable movement relatively to and from the plane of their printing faces in a direction at right angles to said plane, holding means for selectively holding any desired type from said movement away from said plane, and means for moving said platen toward said type to cause printing on said tickets by the faces of the type held by said holding means, said holding means comprising holding elements supported for movement into and out of engagement with said type, and means including finger operated keys bearing indicia corresponding with the printing faces of said type, and an electrical circuit having switches and solenoids therein associated with said keys and elements with the latter connected with said solenoids for causing said movement of said elements to their holding positions upon energizing said solenoids.

5. In a ticket printing and dispensing machine, a printing mechanism comprising a platen and a plurality of printing type having printing faces, said type being substantially coplanar with their printing faces directed normal to the plane of said type and in the same direction, an annular row of printing type adjacent said first mentioned type having radially outwardly facing printing faces one only of which is coplanar with said plurality of printing type with its printing face directed in the same direction as the printing faces on said plurality of type, said platen being supported for movement toward and away from the printing faces of the type in said plane for effecting a printing of the type held in said plane, means supporting said plurality of type for relative movement of the individual type in direction away from said platen, holding means for releasably and selectively holding any of said individual type in said plane for printing upon said movement of said platen toward said type whereby the type so held will print on said ticket, and means supporting said annular row of type for movement of any one of the type thereof into said plane for printing together with the type held by said holding means, said plurality of type being arranged in straight, parallel rows at opposite sides of said annular row.

6. In a ticket printing and dispensing machine, a printing mechanism comprising a platen and a group of printing type respectively having different printing faces, said type being spaced from said platen for movement of a strip of ticket stock longitudinally thereof between said type and said platen, holding means for selectively holding any desired combination of said type in printing relation to said stock and platen for printing of the faces of the type so held on said stock upon movement of said platen toward said last mentioned type, and means for so moving said platen, a single finger manipulatable key for the type of each of the different combinations of said type, means connecting each of said keys with the holding means for each of said combinations of type for moving the holding means designated by said keys into holding relation with the type bearing the desired faces upon finger manipulation of the key corresponding with said desired faces.

7. In a ticket printing and dispensing machine, a printing mechanism comprising a platen and a group of printing type respectively having different printing faces, said type being spaced from said platen for movement of a strip of ticket stock longitudinally thereof between said type and said platen, holding means for selectively holding any desired combination of said type in printing relation to said stock and platen for printing of the faces of the type so held on said stock upon movement of said platen toward said last mentioned type, and means for so moving said platen, a single finger manipulatable key for the type of each of the different combinations of said type, means connecting each of said keys with the holding means for each of said combinations of type for moving the holding means designated by said keys into holding relation with the type bearing the desired faces upon finger manipulation of the key corresponding with said desired faces, means for releasably locking said holding means in position out of holding relation with said type including a finger actuatable key.

8. A machine for printing and dispensing "Quiniela" tickets comprising a main frame, a strip of ticket stock supported in a roll on said frame for unwinding and for movement of the unwound length longitudinally thereof along a path of travel, a first group of printing type along said path and adjacent one flat side of said length, a platen in spaced opposed relation to said type positioned adjacent the opposite side of said length, each of said type bearing a printing face defining symbol designating a particular entry in a race, a second group of type adjacent said first group each bearing a printing face defining a specific race, means for supporting the type of said first group and the type of said second group for movement of any desired pair of type from said first group and any single type of said second group into printing relation with said strip for printing upon relative movement of said platen and the type that are in said printing relation toward each other, means for causing said movement, means for releasably supporting each type of said first group as desired in said printing relation including members respectively engageable with the type of said first group movable into a position holding each of the desired type in said printing relation, and single finger manipulatable means connected with different pairs of said members for simultaneously causing movement thereof, as desired, into holding relation with different pairs of said type.

9. A machine for printing and dispensing "Quiniela" tickets comprising a main frame strip of ticket stock supported in a roll on said frame for unwinding and for movement of the unwound length longitudinally thereof along a path of travel, a first group of printing type along said path and adjacent one flat side of said length, a platen in spaced opposed relation to said type positioned adjacent the opposite side of said length, each of said type bearing a printing face defining symbol designating a particular entry in a race, a second group of type adjacent said first group each bearing a printing face defining a specific race, means for supporting the type of said first group and the type of said second group for movement of any desired pair of type from said first group and any single type of said second group into printing relation with said strip for printing upon relative movement of said platen and the type that are in said printing relation toward each other, means for causing said movement, means for releasably supporting each type of said first group as desired in said printing relation including members respectively connected with the type of said first group movable into a position holding each of the desired type in said printing relation, and single finger manipulatable means connected with different pairs of said members for simultaneously causing movement thereof, as desired, into holding relation with different pairs of said type, the connection between said single finger manipulatable means and said members including an electrical circuit and solenoids therein, said solenoids being operatively connected with said means for releasably supporting said type.

10. In a ticket printing and dispensing machine, a printing mechanism comprising a platen and a group of printing type respectively having different printing faces, said type being spaced from said platen for movement of a strip of ticket stock longitudinally thereof between said type and said platen, holding means for selectively holding any desired combination of said type in printing relation to said stock and platen for printing of the faces of the type so held on said stock upon movement of said platen toward said last mentioned type, and means for so moving said platen, a plurality of electrical circuits including solenoids respectively adapted to actuate said holding means, switches in said circuits for opening and closing the same and manually actuatable keys respectively adapted to actuate a plurality of said switches for energizing said solenoids for holding said any desired number of said type.

11. In a ticket printing and dispensing machine, a printing mechanism comprising a platen and a group of printing type respectively having different printing faces, said type being spaced from said platen for movement of a strip of ticket stock longitudinally thereof between said type and said platen, holding means for selectively holding any desired combination of said type in printing relation to said stock upon movement of said platen toward said last mentioned type, and means for so moving said platen, a plurality of electrical circuits including solenoids respectively adapted to actuate said holding means, switches in said circuits for opening and closing the same and manually actuatable keys respectively adapted to actuate a plurality of said switches for energizing said solenoids for holding said any desired number of said type, power means for driving said platen through a cycle comprising movement toward and away from said type, means for initiating said cycle for movement of said platen toward said type upon actuation of one of said keys including an electrical circuit having a switch therein adapted to be closed by said actuation of said one key.

12. In a printing machine, a plurality of printing type arranged with their printing faces coplanar and floatingly supported and free for movement against the influence of gravity in a direction away from that in which their faces are directed, means for selectively holding certain of said type as desired against said movement, means for forceably moving the material to be printed against said faces whereby imprinting pressure on said material will be effective only insofar as the type so held is concerned and the remainder of said type will engage said material with only the force of gravity thereon.

13. In a printing machine, a plurality of printing type arranged with their printing faces coplanar, said type being floatingly supported and free for movement against the influence of gravity in a direction away from that in which said faces are directed, means for so supporting said type, holding elements selectively movable into positions holding certain of said type against said movement whereby pressure of material to be printed against said faces will receive an imprint only from the printing faces of the type so held and the remainder of said type will engage said material with only the force of gravity thereon.

14. In a printing machine, a plurality of printing type arranged with their printing faces coplanar said type being floatingly supported and free for movement in a direction away from that in which said faces are directed, means for so supporting said type, holding elements selectively movable into positions holding certain of said type, as desired, against said movement whereby pressure of material to be printed against said faces will receive an imprint only from the printing faces of the type so held, the movement of the remainder of said type in said direction being substantially wholly resisted by the influence of gravity on the same.

References Cited in the file of this patent

UNITED STATES PATENTS

| Number | Name | Date |
|---|---|---|
| 806,111 | De Coppet | Dec. 5, 1905 |
| 1,196,729 | Barroll | Aug. 29, 1916 |
| 1,423,325 | Heberling | July 18, 1922 |
| 1,514,109 | Stenstrom | Nov. 4, 1924 |
| 1,746,546 | Meyers et al. | Feb. 11, 1930 |
| 1,798,324 | Kohler | Mar. 31, 1931 |
| 1,838,584 | Smith | Dec. 29, 1931 |
| 1,949,693 | Phillips | Mar. 6, 1934 |
| 1,959,186 | Welter | May 15, 1934 |
| 1,983,247 | Saxby | Dec. 4, 1934 |
| 2,090,612 | Marquart | Aug. 17, 1937 |
| 2,119,713 | Lang | June 7, 1938 |
| 2,179,269 | Ogden | Nov. 7, 1939 |
| 2,599,709 | Griesinger | June 10, 1950 |